US012074933B2

(12) United States Patent
Slater

(10) Patent No.: US 12,074,933 B2
(45) Date of Patent: Aug. 27, 2024

(54) CONTENT DELIVERY ROUTING WITH ON-AIRCRAFT EDGE SERVERS

(71) Applicant: Viasat Inc, Carlsbad, CA (US)

(72) Inventor: Joshua G. Slater, Rancho Mission Viejo, CA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 18/030,254

(22) PCT Filed: Oct. 6, 2020

(86) PCT No.: PCT/US2020/054446
§ 371 (c)(1),
(2) Date: Apr. 4, 2023

(87) PCT Pub. No.: WO2022/075980
PCT Pub. Date: Apr. 14, 2022

(65) Prior Publication Data
US 2023/0275944 A1  Aug. 31, 2023

(51) Int. Cl.
*H04L 65/612* (2022.01)
*H04L 65/1023* (2022.01)
*H04L 65/1045* (2022.01)

(52) U.S. Cl.
CPC ........ *H04L 65/612* (2022.05); *H04L 65/1026* (2013.01); *H04L 65/1045* (2022.05)

(58) Field of Classification Search
CPC .............. H04L 65/612; H04L 65/1026; H04L 65/1045; H04L 67/5682; H04L 67/10
(Continued)

(56) References Cited

U.S. PATENT DOCUMENTS

2013/0242856 A1\* 9/2013 Foxworthy ........... H04W 36/14
  370/316
2013/0332559 A1\* 12/2013 Mas .................... H04L 67/1021
  709/216
(Continued)

FOREIGN PATENT DOCUMENTS

JP  2000/209233 A  7/2000
JP  2007/516683 A  6/2007
(Continued)

OTHER PUBLICATIONS

International Search Report and Written Opinion, PCT/US2020/054446, dated May 28, 2021, 12 pages.

*Primary Examiner* — Tan Doan
(74) *Attorney, Agent, or Firm* — Holland & Hart LLP

(57) ABSTRACT

Methods, systems, and devices are described for providing media content items within a content delivery network including an edge tier of servers located on mobile platforms served by wireless communication links of a communication system and at least one terrestrial tier of servers. An example method may include receiving a request for an item from a device within a mobile platform served via a wireless communication link of the communication system and identifying a mobile edge server located on the mobile platform. The method may include redirecting the request to the mobile edge server if the item is stored on the mobile edge server. If not, the method may include determining whether the item is stored on a first terrestrial server of a first tier of servers. When the item is stored on the first terrestrial server, the method may redirect the request to the first terrestrial server.

38 Claims, 17 Drawing Sheets

(58) Field of Classification Search
USPC .......................................................... 709/231
See application file for complete search history.

(56) References Cited

U.S. PATENT DOCUMENTS

2017/0223029 A1* 8/2017 Sharma ............... H04L 63/1425
2020/0259921 A1* 8/2020 Luft ..................... H04L 65/612

FOREIGN PATENT DOCUMENTS

| JP | 2008/519504 A | 6/2008 |
| JP | 2013/010413 A | 1/2013 |
| JP | 2016/213824 A | 12/2016 |
| WO | WO2010/140376 A1 | 12/2010 |

* cited by examiner

CONTENT DELIVERY ROUTING WITH ON-AIRCRAFT EDGE SERVERS

CROSS REFERENCE

The present Application for Patent is a 371 national phase filing for International Patent Application No. PCT/US2020/54446 by SLATER, entitled "CONTENT DELIVERY ROUTING WITH ON-AIRCRAFT EDGE SERVERS," filed Oct. 6, 2020, assigned to the assignee hereof, and expressly incorporated by reference in its entirety herein.

BACKGROUND

In a wireless communications system, a satellite communication system may provide in-flight entertainment for a number of devices communicatively coupled with the satellite terminals. The entertainment offered to the devices may be content located onboard the aircraft, such as a set of movies stored on a hard drive located on the aircraft. The media content that is stored onboard the aircraft may be limited, due to size, weight, and power constraints onboard the aircraft. Thus, restricting media content items for passengers to only media content stored on the aircraft may degrade the media experience for passengers.

SUMMARY

The described features generally relate to providing a comprehensive system of request routing from requesting client devices to servers of content including on-aircraft edge servers. A content delivery network (CDN) may be defined that includes tiers of servers. A first tier of servers (e.g., on-aircraft edge servers) may be servers located onboard different mobile transports, such as aircraft. A second tier of servers may be servers located on the ground, in different regions. Subsequent tiers of servers may be connected to the second tier of servers. Different servers may store or have access to different media content items. The techniques described herein handle requests for media content items throughout this tier connection topology.

The request routing system may route requests for media content items from devices located within mobile platforms connected to a satellite terminal in a satellite communications system. For example, each customer or passenger may use a device located onboard an aircraft to request a media content item that may or may not be stored onboard the aircraft. The techniques described herein may route requests from requesting client devices to on-aircraft edge servers or to a terrestrial server to locate a source that has access to the media content item. For example, a passenger on an aircraft may request a movie to play on their mobile device. A CDN domain name system (DNS) (e.g., terrestrial or onboard the aircraft) may receive the request and determine whether the requested media content item is already stored onboard the aircraft. If the requested media content item is stored on the aircraft, the onboard edge server provides the media content item to the mobile device. However, if the requested media content item is not stored on the aircraft, the system routes the request to a terrestrial server with the media content (e.g., directly or via other terrestrial servers) In some cases, different servers may be associated with different content providers and have access to different material. The media content items may be on-demand or live streamed content items.

Techniques described herein provide different ways to use the topography of the network to provide content to client devices, perform handovers, and maintain and update CDN tier connection topology. Once a server is found that contains the requested media content item, the CDN may provide the on-aircraft edge server or the client device with the network address for the server that contains the requested media content item. In some examples, the server is selected because it may be the closest server to the client device in terms of network proximity, not necessarily geographic location. The client device or the edge server then requests the media content item from the server. The server may stream the media content item to the client device as long as the aircraft remains within a coverage area of one or more satellite access nodes associated with the server. Once the aircraft begins to fly out of the coverage area, a handover to another server which contains the requested media content item may be performed.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
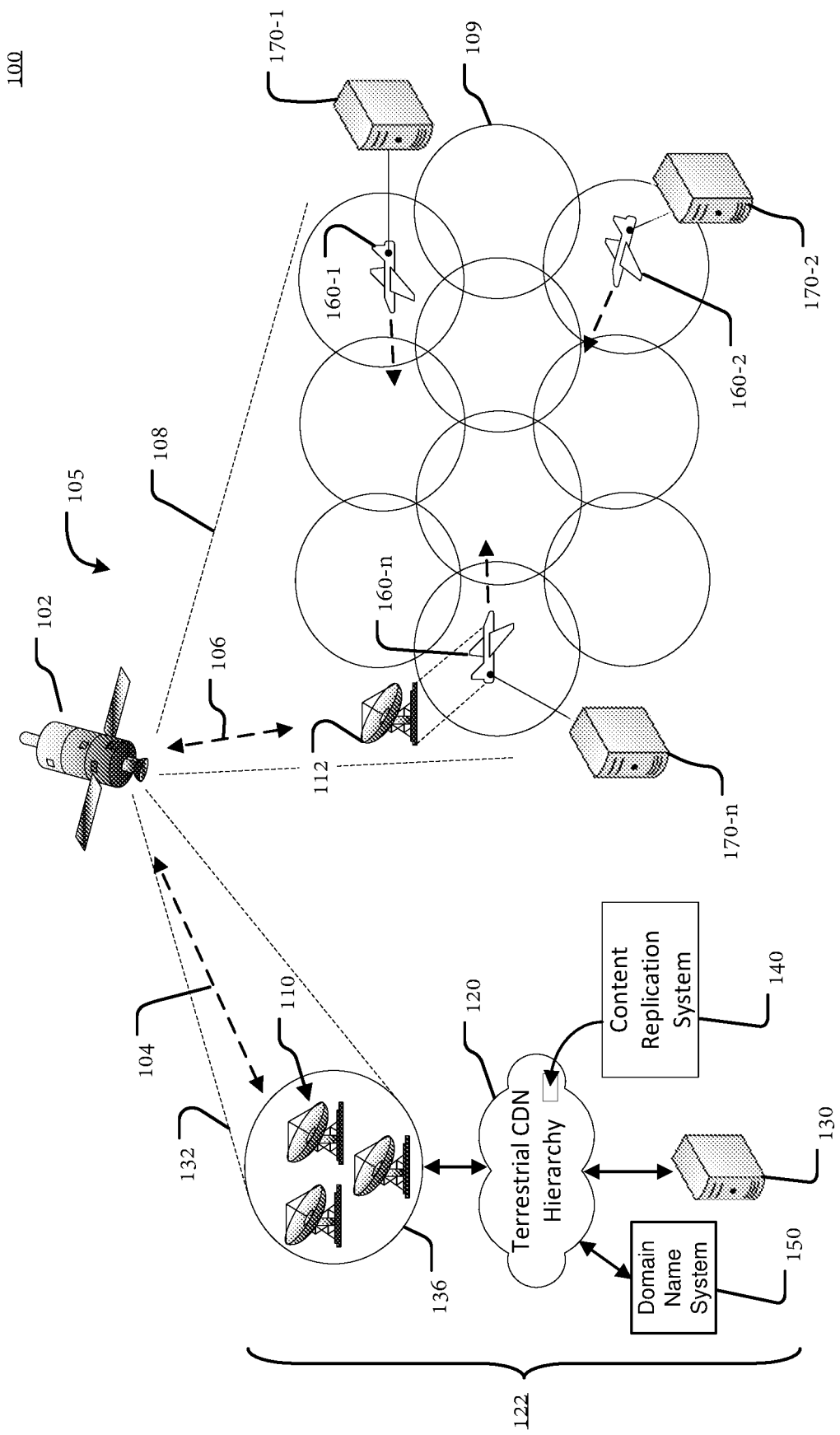
FIG. 1 shows a diagram of a satellite communication environment, in accordance with aspects of the present disclosure.

A satellite terminal (e.g., a multi-user access terminal) within a satellite communication system may employ a communications antenna to establish a communications link between the satellite terminal and a communications satellite. The communications link may be configured for bi-directional communications (e.g., transmitting and receiving, etc.), or uni-directional communications (e.g., receiving), in some cases. Such a communication link may provide communication services between a ground-based network and a mobile platform that includes a satellite terminal. These communication links may be used to provide services to devices (e.g., user devices such as mobile phones, tablets, and laptops) for passengers located on the mobile platform.

The techniques described herein provide content items, such as a media item, at a client device located onboard a mobile platform, such as an aircraft, which has connectivity to external networks via the satellite communication system. The satellite communication system relays network traffic for the particular content item between the client device and a content delivery network. That is, techniques described herein provide delivery of content to client devices on mobile platforms via the content delivery network while the mobile platforms are en route. A content delivery network may include terrestrial servers located on the ground and edge servers located on mobile platforms such as aircraft, ships, trains, spacecraft, or the like. The content delivery network may include one or more tiers of terrestrial servers and one or more tiers of edge servers. A satellite terminal may connect a mobile edge server of the edge tier of servers of the content delivery network to at least one terrestrial server of a terrestrial tier of servers of the content delivery network via one or more satellite communication links. Content stored at the one or more tiers of terrestrial servers may be provided to a mobile edge server or to a client device directly through the satellite communication links. The mobile edge server may forward the content to a client device on a mobile platform.

According to aspects of the present disclosure, the content delivery network may provide one or more content items to a satellite terminal. The satellite terminal may provide the content items to devices onboard the mobile platform that are in communication with the satellite terminal. The CDN may locate a server that is the closest in terms of network proximity to the client device. The CDN may use a content replication system to determine which server contains the requested media content item. Once a suitable source is located, the CDN may provide a network address for the server to the client device or an associated edge server. The client device or edge server may use the network address to obtain the media content item from the server.

In some examples, the CDN returns the address of the associated edge server to the client device. The client device may then request the media content item from the edge server. If the edge server stores the media content item, the edge server may provide it to the client device. If the edge server does not store the media content item, the edge server may then begin to request the media content item through the connected tier of servers.

Techniques described herein may also enable the CDN to push media content items to be stored on different servers. For example, a CDN may instruct a media content item stored at a distant server to be pushed to a closer server or even to the edge server.

In some examples, the content item may be on-demand or live streamed. The satellite terminal may facilitate access to the content item by acting as a relay for the network activity. In some examples, the content item may be multi-casted as a live stream, where live content is streamed to multiple devices simultaneously.

This description provides examples, and is not intended to limit the scope, applicability or configuration of embodiments of the principles described herein. Rather, the following description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

FIG. 1 shows a diagram of a satellite communications environment 100, in accordance with aspects of the present disclosure. The satellite communications environment 100 includes a wireless communications system 105, which in the example illustrated in FIG. 1 is a communications satellite system. The example satellite communications system 105 includes one or more communications satellites 102, one or more gateways 110, and one or more satellite terminals 112. Satellite terminals 112 may be multi-user access terminals providing network access connectivity to multiple user devices on a mobile platform 160. Satellite communications environment 100 may include a CDN 122. The CDN 122 may include one or more mobile platform edge servers 170, a terrestrial CDN hierarchy 120, and one or more origin servers 130.

The one or more communications satellites 102 in the satellite communications system 105 may include any suitable type of communication satellite configured for wireless communication with the one or more gateways 110 and the one or more satellite terminals 112. In some examples, some or all of the communications satellites 102 may be in geostationary orbits, such that their positions with respect to terrestrial devices may be relatively fixed, or fixed within an operational tolerance or other orbital window. In other examples, any appropriate orbit (e.g., low Earth orbit (LEO), medium Earth orbit (MEO), etc.) for one or more communications satellites 102 of the satellite communications environment 100 may be used.

The satellite terminal 112 may include a satellite terminal communications antenna configured for receiving and transmitting signals 106 from and to the communications satellite 102. Thus, the satellite terminal 112 may be configured for uni-directional or bi-directional communications with one or more communications satellites 102 of the satellite communications system 105. In some examples, the satellite terminal communications antenna may be directional. For example, the satellite terminal communications antenna may have a peak gain along a primary axis (e.g., an antenna boresight). In some examples, the peak gain may roll off steeply in off-axis directions. A steep roll-off in antenna gain may be referred to as a narrow field of view of an antenna. In some examples the satellite terminal communications antenna may be configured with a narrow field of view by way of a fixed configuration of focusing and/or reflecting elements such as an antenna having a parabolic dish reflector or array of antenna elements. The satellite terminal communications antenna may be positioned (e.g., to point at a communications satellite 102) by a positioner (e.g., elevation/azimuth positioner). In some examples the satellite terminal communications antenna may be configured with a narrow field of view by way of beamforming, where the field of view may be electronically configurable at an array of antenna elements to aim signal transmission and/or reception along a desired direction.

The communications satellite 102 may communicate via service beams 108 directed towards service beam coverage areas 109 that include the satellite terminals 112. For illustration purposes, FIG. 1 shows an aggregate of service beams 108, where each service beam 108 may be associated with a service beam coverage area 109. The service beam coverage areas 109 may cover any suitable service area (e.g., circular, elliptical, hexagonal, local, regional, national, etc.) and provide service to any number of satellite terminals 112 located within the service beam coverage areas 109. In some examples, the communications satellite 102 may be a multibeam satellite and may have multiple service beams 108 covering multiple service beam coverage areas 109, which may or may not overlap with adjacent service beam coverage areas.

The communications satellite 102 may transmit a forward link signal in the signal 106 via the service beam 108 to be received by the satellite terminal 112. The satellite terminal 112 may receive the forward link signal using a satellite terminal communications antenna. To establish a suitable communications link for forward link signals between the satellite terminal 112 and the communications satellite 102, the forward link signal may be received at the satellite terminal 112 with a signal strength or a signal-to-noise ratio (SNR) above a threshold, which may depend on the transmission power of the communications satellite 102, the alignment and position of the satellite terminal communications antenna, and the attenuation environment around the satellite terminal communications antenna (e.g., the attenuation environment between the satellite terminal 112 and the communications satellite 102).

The communications satellite 102 may communicate with one or more of the gateways 110 by sending and/or receiving signals 104 through one or more gateway beams 132, each of which may be associated with a respective gateway beam coverage area 136. Gateway beams 132 may, for example, carry communications traffic for the one or more satellite terminals 112 (e.g., relayed by the communications satellite 102), or other communications between the communications satellite 102 and the one or more gateways 110.

The satellite terminal 112 may transmit return link signals via signals 106 to the communications satellite 102, which may relay the return link signals to one or more gateways 110 via the signals 104. To establish a suitable communications link for return link signals between the satellite terminal 112 and the communications satellite 102, the return link signals may be received at the communications satellite 102 with a signal strength and/or SNR above a threshold, which may again depend on the transmission power of the satellite terminal 112, the alignment and position of a satellite terminal communications antenna of the satellite terminal 112, and the attenuation environment around the satellite terminal communications antenna (e.g., the attenuation environment between the satellite terminal 112 and the communications satellite 102). For example, the satellite terminal communications antenna may be considered to be properly aligned with a target (e.g., communications satellite 102) when a transmitted signal of the satellite terminal 112 has sufficient antenna gain in the direction of the target to permit signal communication having desired performance characteristics.

The satellite terminal 112 may be part of a satellite terminal antenna assembly, which may also include various hardware for mounting the satellite terminal antennas, which may be mounted on the mobile platform 160. The mobile platform 160 may carry or be coupled to the satellite terminal 112, which may include a satellite terminal antenna assembly and a satellite terminal receiver. A satellite terminal antenna assembly may also include circuits and/or processors for converting (e.g., performing frequency conversion, modulating/demodulating, multiplexing/demultiplexing, filtering, forwarding, etc.) between radio frequency (RF) satellite communication signals (e.g., signals 106), and satellite terminal communications signals transmitted between the satellite terminal communications antenna and a satellite terminal receiver. Such circuits and/or processors may be included in an antenna communication assembly, which may be mounted on the outside of the mobile platform 160 (e.g., outside of the fuselage of an aircraft). Additionally or alternatively, the satellite terminal receiver may include circuits and/or processors for performing various RF signal operations (e.g., receiving, performing frequency conversion, modulating/demodulating, multiplexing/demultiplexing, etc.).

The satellite terminal 112 may be connected via a wired or wireless connection to one or more devices within the mobile platform 160 and may provide a plurality of content offerings, such as streamed network access services (e.g., Internet access, content items, etc.) or other communication services (e.g., broadcast media, etc.), that are particular to each of the devices via the satellite communications environment 100. The device(s) within the mobile platform 160 may include user devices such as, but not limited to, mobile phones, personal digital assistants (PDAs), other handheld devices, netbooks, notebook computers, tablet computers, laptops, or other display devices used for connectivity or consuming content (e.g., TVs, computer monitors, etc.). In some examples, the satellite terminal 112 provides for two-way communications between the device and the terrestrial CDN hierarchy 120 via the communications satellite 102 and the gateways 110.

The satellite communications environment 100 (including the communications satellite 102, the gateways 110, and the satellite terminal 112, etc.) may operate in one or more frequency bands. For example, the wireless communications system may operate in the International Telecommunications Union (ITU) Ku, K, or Ka-bands, C-band, X-band, S-band, L-band, and the like.

The satellite terminal 112 may be located on a mobile platform 160. A mobile platform 160 may be any device, apparatus, or object capable of supporting the satellite terminal 112 and of moving locations. For example, the mobile platform 160 may be a mobile platform carrier such as an aircraft, a ship, a vehicle (e.g., car, bus, train), a space vehicle, or the like. As illustrated in FIG. 1, the mobile platform 160 is an aircraft, but other types of mobile platforms such as boats, ships, trains, or busses may include satellite terminals 112 and/or edge servers 170 in other examples. FIG. 1 depicts three mobile platforms 160, a first mobile platform 160-1 with a first edge server 170-1, a second mobile platform 160-2 with a second edge server 170-2, and an $n^{th}$ mobile platform 160-$n$ with an $n^{th}$ edge server 170-$n$.

The one or more gateways 110 may send and receive signals 104 to and from communications satellites 102 of the satellite communications system using gateway antenna systems. Gateway antenna systems may be two-way capable and designed with adequate transmit power and receive sensitivity to communicate reliably with at least one communications satellite 102 of the satellite communications system. A gateway 110 may also communicate with a terrestrial content distribution network hierarchy 120. Satellite terminals 112 within satellite communications environment 100 may access the terrestrial CDN hierarchy 120 via the one or more gateways 110. The terrestrial CDN hierarchy 120 may include terrestrial servers connected via one or more networks, such as a local area network (LAN), metropolitan area network (MAN), wide area network (WAN), or any other suitable public or private network and may be connected to other communications networks such as the Internet, telephony networks (e.g., Public Switched Telephone Network (PSTN), etc.), and/or the like.

The terrestrial CDN hierarchy 120 may represent the terrestrial portion of the content delivery network and may include one or more tiers of servers. Each tier of servers may include one or more servers. In some examples, a tier of servers includes a plurality of servers that are located throughout a geographic region. The servers may store or have access to stored media content items. Some of the media content items may be stored on or at just one server while other media content items may be stored on or at multiple servers. In some examples, each of the servers in a tier of servers stores the same content items, while in other examples a server within a tier of servers may store at least some unique media content items with respect to other servers in its tier of servers.

The terrestrial CDN hierarchy 120 may include two or more tiers of servers as well as one or more origin servers 130. A first tier of servers may include a first quantity of servers that are geographically dispersed across a service area. A second tier of servers may include a second quantity of servers that is less than the first quantity of servers. While the second tier of servers may also be geographically dispersed, the second tier of servers may generally have a larger geographic or networking distance between servers or between peripheral connections (e.g., where users or gateways 110 may be located) of a network and any given server of the second tier of servers. In some examples, servers of the second tier of servers may generally store more content (e.g., have a larger storage capacity) than servers of the first tier of servers.

The one or more origin servers 130 may be part of the terrestrial CDN hierarchy 120 as the last tier of servers. That is, there may not be another tier of servers connected after the origin server 130. For example, the terrestrial CDN hierarchy 120 may include a first tier of servers, a second tier of servers connected to the first tier of servers, a third tier of servers connected to the second tier of servers, etc., until an $n^{th}$ tier of servers is connected to one or more origin servers 130.

The origin server 130 may represent one or more servers that ultimately store the media content items that are replicated throughout the content delivery network. That is, one or more of the media content items stored at an origin server 130 may be copied onto other servers in other tiers of servers. In some examples, the origin server 130 may include a media content item that is not stored on any other server. In such a case, the origin server 130 provides that media content item when requested. In some examples, an origin server 130 may be associated with a content provider, and may be separate from the CDN hierarchy 120. Thus, the CDN 122 may provide CDN services for one or more content providers, where each content provider is associated with a different origin server 130.

A terrestrial server (e.g., of the first tier of servers of terrestrial CDN hierarchy 120) may be coupled with a gateway 110 and one or more other servers. In various examples, the terrestrial server may be co-located or otherwise located nearby one or more gateways 110, or may be installed at an Internet exchange point (IXP) between the ground network serving a gateway 110 and other networks. Thus, the terrestrial server may communicate with the gateway 110 and/or the terrestrial CDN hierarchy 120 via one or more wired and/or wireless communications links.

The terrestrial CDN hierarchy 120 may include a content replication system 140 and a domain name system 150. The content replication system 140 may manage and control operations of the content delivery network 122, including the terrestrial CDN hierarchy 120 and the edge servers 170. The domain name system 150 may maintain a list of domain names and addresses for each server in the CDN 122 and one or more origin servers 130 (e.g., if outside the CDN 122). The domain name system 150 may be queried when the satellite communications environment 100 receives (e.g., from a device onboard mobile platform 160) a request for a media content item. Portions of the content replication system 140 and domain name system 150 may be located within various servers of the CDN 122 including terrestrial servers, the origin server 130, or the edge servers 170.

As described, the CDN 122 includes a terrestrial CDN hierarchy 120 and a plurality of mobile edge servers 170. This network topology provides flexibility for what media content is stored onboard mobile platforms. For example, due to size, weight, and power (SWaP) requirements of aircraft, the CDN 122 may have a "hybrid" CDN topology. That is, due to the SWaP requirements, the edge servers 170 may have a relatively low storage capacity compared to at least some of the servers in the terrestrial CDN hierarchy 120. For example, a server in the terrestrial CDN hierarchy 120 may effectively be a high-capacity data center. This topology enables devices on the mobile platforms 160 to be able to access a much greater amount of media content than would otherwise be available on-board the mobile platform 160. In some examples, the number of edge servers 170 may be greater than the number of servers in the terrestrial CDN hierarchy 120. In other words, multiple edge servers 170 may be associated with the same server in the terrestrial CDN hierarchy 120. An association may mean that a terrestrial server and the one or more edge servers may be connected in the network tier connection topology.

The satellite communications environment 100 may use techniques described herein to route media content items to one or more devices onboard a mobile platform 160 in response to the requests for the media content items. The media content may be provided regardless of the location of the mobile platform 160. The satellite communications environment 100 may provide communications between the onboard devices and ground-based CDNs that hosts the media content item. These techniques may reduce costs, improve streaming functionality, reduce size, weight, and power requirements onboard mobile platforms, provide more personalized and relevant media content items to passengers, and may reduce network traffic.

Figure 2:
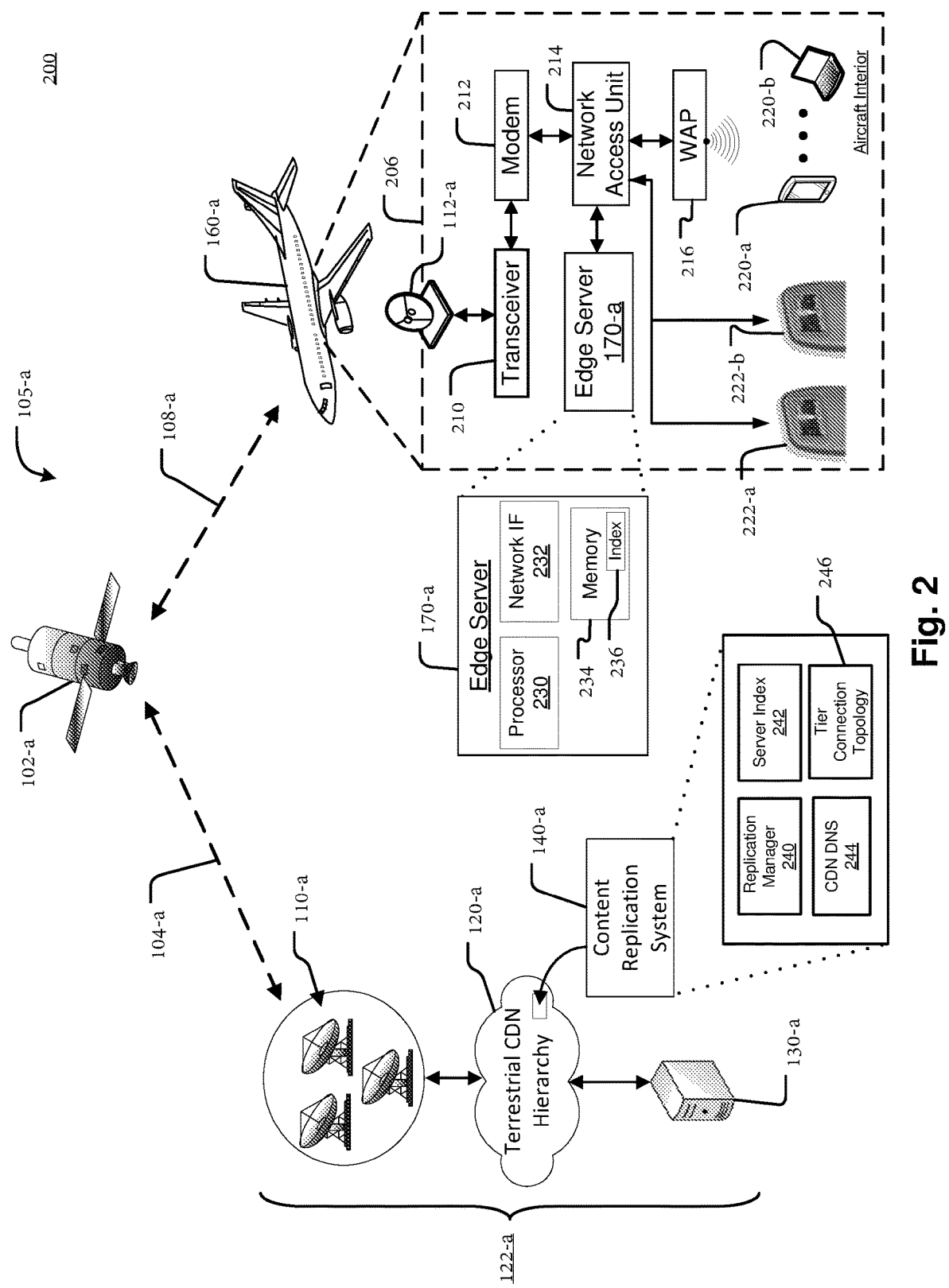
FIG. 2 shows a diagram of a satellite communication environment, in accordance with various aspects of the present disclosure.

FIG. 2 shows a diagram of a communication environment 200, in accordance with various aspects of the present disclosure. The communication environment 200 includes a wireless communication system 105-*a*, illustrated in FIG. 2 as a satellite communication system including at least one satellite 102-*a*, gateways 110-*a*, and satellite terminal 112-*a* on board a mobile platform 160-*a* (e.g., an aircraft). The communication environment 200 also includes a CDN 122-*a*, which may include a terrestrial CDN hierarchy 120-*a*, an origin server 130-*a*, and an edge server 170-*a* on board the mobile platform 160-*a*. The terrestrial CDN hierarchy 120-*a* may be in communication with the gateways 110-*a*. In operation, the wireless communication system 105-*a* provides for two-way communications between devices on the mobile platform 160-*a* including the edge server 170-*a* and terrestrial networks including the terrestrial CDN hierarchy 120-*a* and other networks (e.g., the Internet). The satellite 102-*a*, the gateways 110-*a*, the satellite terminal 112-*a*, the origin server 130-*a*, and terrestrial CDN hierarchy 120-*a* may be an example or include aspects of the satellite 102, the gateways 110, the satellite terminal 112, the origin server 130, and the terrestrial CDN hierarchy 120 of FIG. 1, respectively.

The one or more satellites 102-*a* in the satellite communication system 105-*a* may include any suitable type of communication satellite. In some examples, some or all of the satellites may be in geosynchronous or geostationary earth orbit (GEO). In other examples, any appropriate orbit (e.g., medium earth orbit (MEO), low earth orbit (LEO), etc.) for satellite communications system 105-*a* may be used. Some or all of the satellites 102-*a* of satellite communication system 105-*a* may be multi-beam satellites configured to provide services for multiple service beam coverage areas in a predefined geographical service area.

The gateways 110-*a* may be two-way capable and designed with adequate transmit power and receive sensitivity to communicate reliably with the satellite communication system 105-*a*. The satellite communication system 105-*a* may communicate with the gateways 110-*a* by sending and receiving signals 104-*a* through one or more beams. The gateway 110-*a* sends and receives signals 104-*a* to and from the satellite communication system 105-*a* using a gateway antenna system. The gateways 110-*a* may be connected to the one or more networks as well as the terrestrial CDN hierarchy 120-*a*.

The terrestrial CDN hierarchy 120-*a* may include a content replication system 140-*a*. The content replication system 140-*a* may include a replication manager 240, a server index 242, a CDN domain name system (DNS) 244, and a tier connection topology 246. The replication manager 240 may manage the replication of content within the terrestrial CDN hierarchy 120-*a* and the on-aircraft edge servers, such as the edge server 170-*a*. A media content item may be stored only on a single server, or it may be replicated on two or more servers. For example, newer or more popular media content items may be stored on several servers, which may include terrestrial servers or on-aircraft edge servers. In contrast, obscure, older, or less popular media content items may be stored on fewer servers. The replication manager 240 may keep track of where media content items are stored, control replicating certain media content items on certain servers, provide commands for replication or deletion, and the like. The replication manager 240 may use the server index 242 to determine where media content items are stored. The server index 242 may be an index of content stored in each of the edge servers, such as the on-aircraft edge server 170-*a*, and the various servers in the terrestrial CDN hierarchy 120-*a*.

The CDN DNS 244 may receive domain name system queries for requested content items, which may be generated based on requests for content made by a client device 220 or 222. The CDN DNS 244 may resolve the DNS queries for requested content. The CDN DNS 244 may map the DNS request to an appropriate CDN server to enable the requesting client device 220 or 222 to obtain the requested content. The appropriate CDN server may be part of the terrestrial CDN hierarchy 120-*a* or may be an edge server. Mapping the DNS request to an appropriate CDN server may be preceded by an initial DNS request to a non-CDN DNS server (referred to below as a "DNS resolver") that redirects the DNS query to the CDN DNS 244. The CDN DNS 244 may determine the closest server that currently stores the requested content using the server index 242 and the tier connection topology 246.

The CDN DNS 244 may use a variety of techniques to resolve a DNS query. For example, each satellite access node (or other entity in the satellite communication system 105-*a* such as a core node) may include a DNS resolver that receives the DNS query from a client device 220 or 222. As another example, each aircraft 160-*a* may include a DNS resolver. The DNS resolver may append information to the DNS query and provide the modified DNS query to the CDN DNS 244. For example, the appended information may identify the aircraft from which the request originated. In such a case, the CDN DNS 244 may store a table indicating which aircraft contain which edge servers, and look up the identifying information to determine the edge server on the aircraft from which the request originated. As another example, the appended information may identify the edge server on the aircraft. Upon determining the edge server on the aircraft, the CDN DNS can then use the tier connection topology 246, and return the address of the appropriate CDN server to the client device 220 or 222 (e.g., using some of the techniques illustrated in FIGS. 6-8).

Figure 6:
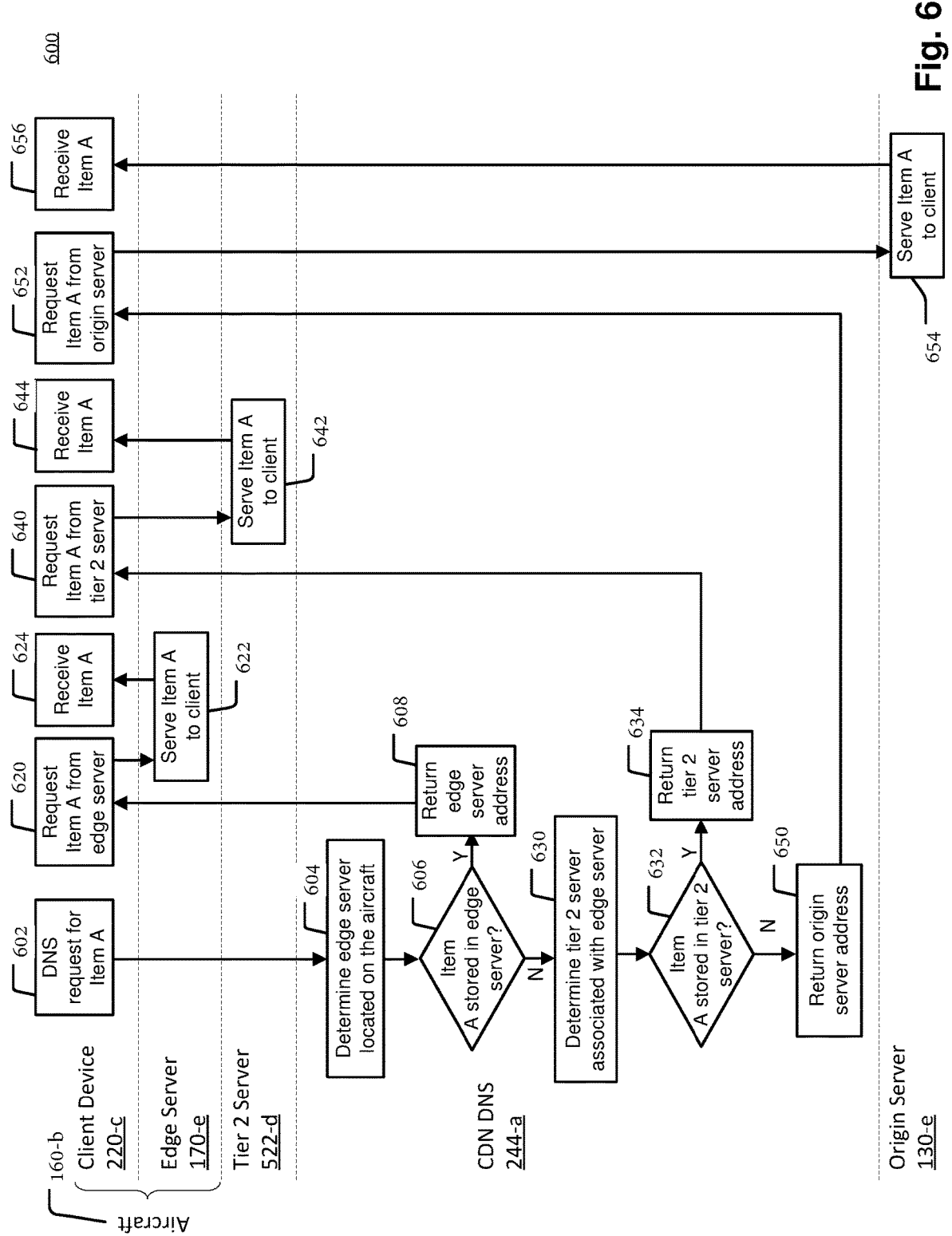
FIG. 6 shows a process flow of example content delivery routing for an on-aircraft edge server, in accordance with various aspects of the present disclosure.

In some examples, such as the example illustrated in FIG. 6, the CDN DNS 244 may return the address of the closest server from which the requesting client device 220 or 222 can then obtain the content. In examples in which the CDN DNS 244 returns the address of the closest server (closest in network proximity, not necessarily physical proximity) to the requesting client device that currently stores the requested content, the CDN DNS 244 may use the server index 242 to determine whether particular servers currently store the content. In alternative examples, such as the example illustrated in FIG. 7, the CDN DNS 244 may return the address of the on-aircraft edge server 170-a and the on-aircraft edge server 170-a is then responsible for obtaining the content using the tier connection topology 246 or from a locally stored copy.

The tier connection topology 246 manages the associations or relationships between the edge servers and the servers of the terrestrial CDN hierarchy 120-a. For example, the tier connection topology 246 may know how the different servers are connected to each other within the various networks. The tier connection topology 246 may also know which servers are among which tiers of the terrestrial CDN hierarchy 120-a.

The CDN DNS 244 may use the tier connection topology 246 to return the address of the appropriate CDN server to the client device 220 or 222. The tier connection topology 246 may also be used by a given CDN server of the terrestrial CDN hierarchy 120-a to know which "upstream" server(s) to request content from if that given CDN server does not currently store the content. For example, the tier connection topology between an on-aircraft edge server and a tier-2 server (or servers) is where the on-aircraft edge server could obtain requested content that is not currently stored on the on-aircraft edge server.

In examples in which there are multiple tiers of servers in the terrestrial CDN hierarchy 120-a, the tier connection topology 246 may indicate the relationship between the servers of those various tiers. The content replication system 140-a may distribute tier connection topology information to the various servers of the CDN (e.g., CDN 122), and may send updates as needed due to changes in the connection topology of the tiers. In particular, due to the mobile nature of the aircraft 160-a, a satellite access node servicing the aircraft 106-a may change when the aircraft 106-a moves to different user beams. As a result, the servers of the terrestrial CDN hierarchy 120-a that are closest in network proximity to the edge server on the aircraft 160-a may change over time. Thus, the content replication system 140-a may update the tier connection topology 246 for the edge server 170-a in order to improve delivery of content. In addition to network proximity, the content replication system 140-a may also take other factors into consideration (e.g., load balancing, network speeds, etc.) when managing the tier connection topology 246.

The aircraft communication equipment 206 may include a satellite terminal 112-a, (which may be, be part of, or include aspects of a multi-user access terminal), an edge server 170-a, a network access unit 214, a wireless access point 216, and user devices 220 and 222. The satellite terminal 112-a may include one or more mobile terminal antennas, a transceiver 210, and a modem 212.

The aircraft 160-a includes the aircraft communication equipment 206 that includes a satellite terminal 112-a, including an antenna, which may be an antenna array. The aircraft 160-a may use an antenna of the satellite terminal 112-a to communicate with the satellite communication system 105-a via one or more signals 108-a. Portions of the satellite terminal 112-a (e.g., the antenna, transceiver 210) may be mounted on the outside of the fuselage or other location on the exterior of aircraft 160-a, and may be installed under a radome. In other examples, other types of housings may be used to house portions of satellite terminal 112-a. Other portions of the satellite terminal 112-a may be on the interior of the aircraft (e.g., modem 212). The satellite terminal 112-a may operate in the ITU Ku, K, or Ka-bands.

Alternatively, the satellite terminal 112-a may operate in other frequency bands such as C-band, X-band, S-band, L-band, and the like.

Data sent over the downlink and uplink to the satellite communication system 105-a over the one or more signals 104-a and 108-a may be formatted using a modulation and coding scheme (MCS) that may be custom to the satellite or similar to others in the industry. For example, the MCS may include multiple code-points that each are associated with a modulation technique (e.g., BPSK, QPSK, 16QAM, 64QAM, 256QAM, etc.) and a coding rate that is based on a ratio of the coded information bits to a total number of coded bits including redundant information.

The edge server 170-a may be located on-board the aircraft 160-a and may include a processor 230, a network interface 232, and a memory 234. The processor 230 may execute instructions stored on the memory 234 to perform the functions of the edge server 170-a. The memory 234 may store the instructions for the operation of the edge server 170-a, local copies of content, and may also store an index 236. The index 236 may be an index of content stored at the memory 234. In some examples, the index 236 may be an index of content stored at other servers and indicate the stored location of the content. The index 236 may be used to determine whether requested is content stored locally, and whether it can be retrieved.

The on-board communication system of the aircraft 160-a may provide communication services for client devices 220 and 222 of the aircraft 160-a via the modem 212. Client devices 220 and 222 may connect to and access the terrestrial CDN hierarchy 120-a through the modem 212. The client devices 220 and 222 may be mobile or other devices within the aircraft 160-a. The client devices 220 and 222 may communicate with the modem 212 via network access unit 214, which may provide network services such as DNS, IP address management (e.g., dynamic host configuration protocol (DHCP)), network address translation (NAT), and the like. The client devices 220 or 222 may connect with network access unit 214 via wired or wireless connections. For example, client devices 222 may connect to network access unit 214 via wireless access point (WAP) 216, which may provide wireless connectivity within the aircraft 160-a. The wireless connectivity may be, for example, according to a wireless local area network (WLAN) technology such as IEEE 802.11 (Wi-Fi), or other wireless communication technology.

In the example of FIG. 2, two client devices 220-a and 220-b are shown (collectively referred to herein as client devices 220), as well as two client devices 222-a and 222-b (collectively referred to herein as client devices 222). In other examples, other numbers of client devices 220 and 222 may be included. A client device 220 may be a mobile device such as a wireless device, a remote device, a handheld device, a subscriber device, or some other suitable terminology, where the "device" may also be referred to as a unit, a station, a terminal, or a client. A client device 220 may also be a personal electronic device such as a cellular phone, a personal digital assistant (PDA), a tablet computer, a laptop computer, a personal computer, or the like. The client device 222 may be devices installed within the aircraft 160-a, such as a display screen or monitor on the back of a seat.

A client device 220 or 222 may generate a request for a content item. For example, a user associated with the client device 220-a may use connectivity provided by WAP 216, network access unit 214, and satellite terminal 112-a to browse available content items from a media provider associated with CDN 122-a (e.g., connecting to origin server 130-a or another server within terrestrial CDN hierarchy 120-a). Upon selecting a content item to accept, the user may prompt the client device 220-a to send a request for the content item, which may identify the selected content item and any other relevant information including requested features, duration of the content, related content, recommended content, and the like. The CDN 122-a may be used to provide the content to the client device 220-a. For example, if the content is locally stored at edge server 170-a, edge server 170-a may serve the content (e.g., via network access unit 214 and WAP 216). If the content is not locally stored, a server of the terrestrial CDN hierarchy 120-a may provide the content (e.g., served via satellite terminal 112-a, network access unit 214, and WAP 216).

The satellite communication environment 200 may use techniques described herein to route requests for media content items to client devices onboard a mobile platform 160. The CDN 122-a may provide network addresses for one or more servers where the media content item may be obtained by the client device or an associated edge server 170-a. The media content item may be provided regardless of the location of the mobile platform 160 and by servers which may be further away geographically (e.g., closer in network topology accounting for connection via satellite 102-a and gateways 110-a) than other servers which store the media content item. These techniques may reduce costs, improve streaming functionality, reduce size, weight, and power limitations onboard mobile platforms, provide more personalized and relevant media content items to passengers, provide a wider range of media content items to passengers, or reduce network traffic.

Figure 3:
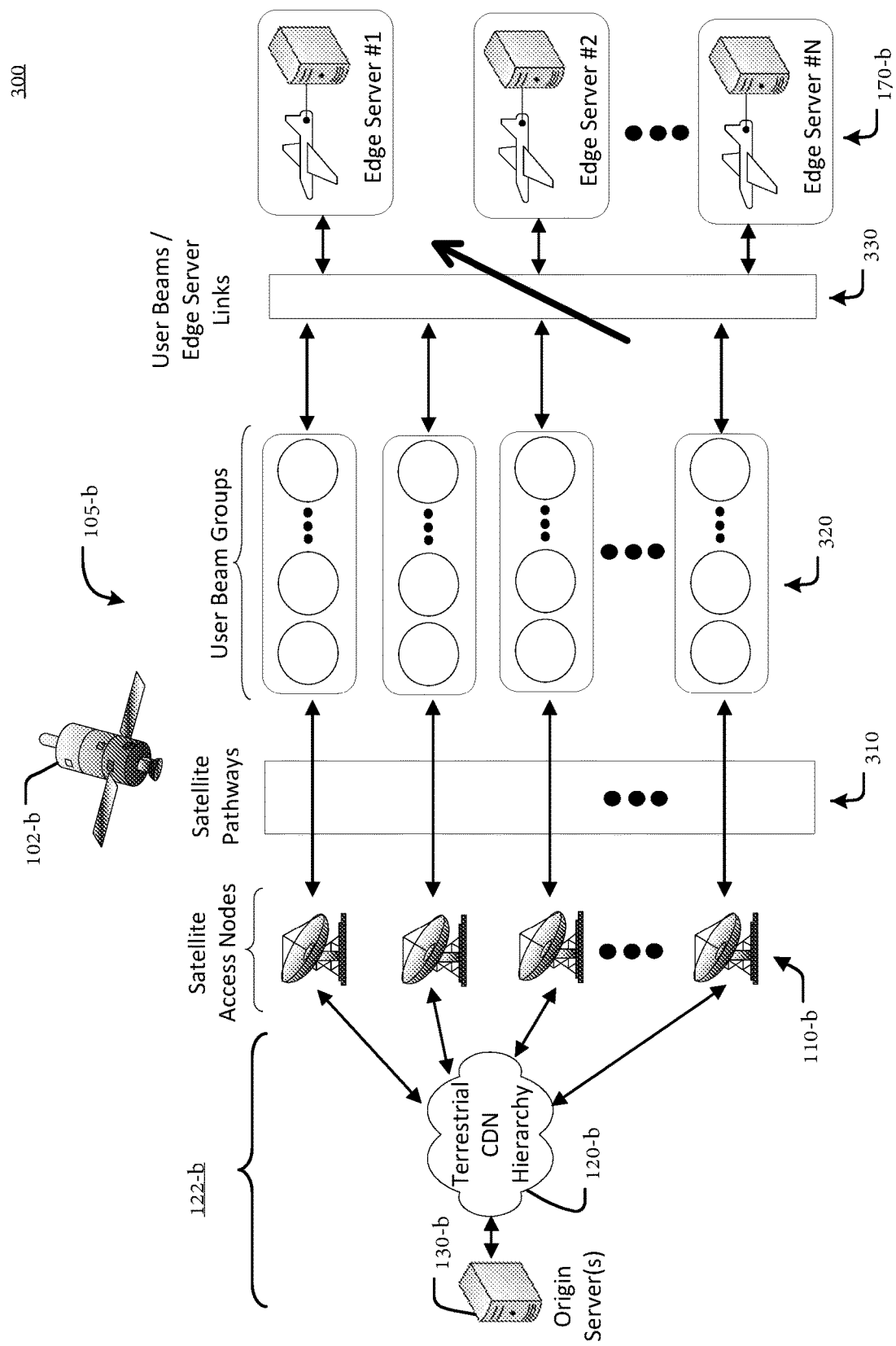
FIG. 3 shows a block diagram of an example of satellite pathways in a satellite communication environment, in accordance with various aspects of the present disclosure.

FIG. 3 shows a block diagram of an example of satellite pathways 310 in a communication environment 300, in accordance with various aspects of the present disclosure. The communication environment 300 includes a wireless communication system, depicted in FIG. 3 as satellite communication system 105-b. Satellite communication system 105-b includes at least one satellite 102-b and a plurality of satellite access nodes 110-b (also referred to herein as gateways 110-b). Communication environment 300 also includes a CDN 122-a, which includes a terrestrial CDN hierarchy 120-b, an origin server 130-b, and edge servers 170-b located onboard various mobile platforms, which may be aircraft. The satellite communication system 105-b, the satellite 102-b, the gateways 110-b, the CDN 122-b may be an example or include aspects of the satellite communication systems 105, the satellites 102, the gateways 110, and the CDNs 122 of FIGS. 1 and 2.

The satellite communication system 105-b may provide communication connectivity between satellite access nodes 110-b and edge servers 170-b. The satellite access nodes 110-b may be distributed over a wide geographic area. The satellite access nodes 110-b may each use one or more of satellite pathways 310 to communicate with terminals (e.g., mobile terminals 112) within the satellite communication system 105-b. Each satellite access node 110-b may communicate with terminals within a one or more user beam groups 320 via the satellite pathways 310.

The correspondence between gateways 110-b and user beam groups 320 may be fixed or dynamic. In examples where the correspondence between satellite access nodes 110-b and user beam groups 320 is dynamic, the user beam groups 320 for a particular satellite access node 110-b can change over time. However, in the example of FIG. 3, the correspondence between the satellite access nodes 110-b and the user beam groups 320 is fixed, meaning that the user beam groups 320 associated with a particular satellite access node 110-b does not change over time. In some examples, the user beams within a user bream group 320 are fixed, while in other examples user beams may be dynamic (e.g., active or deactivated).

As shown in FIG. 3, an aircraft and its edge server 170-b may be in communication with a particular satellite access node 110-b depending upon the user beam group 320 that the aircraft is within. Thus, as the aircraft moves to among the user beams groups 320, the aircraft may change which satellite access node 110-b provides connectivity. The correspondence between the on-aircraft edge servers 170-b and the user beam groups 320 is represented by the user beams/edge server links 330 shown with an arrow representing the change over time.

The edge servers 170-b may provide a content item to client devices onboard the aircraft. Where content items are not available on a given edge server 170-b, the content items may be retrieved from the origin server 130-b or from another server among the terrestrial CDN hierarchy 120-b. Which satellite access node 110-b provides connectivity for the edge server 170-b of the requesting aircraft may depend on a location of the aircraft at the time of the request or delivery of the content item. Because the communicating satellite access node 110-b may change as the aircraft travels to different locations that are covered by different user beam groups 320, the proximity between an edge server 170-b and servers of the terrestrial CDN hierarchy may change over time.

Figure 4:
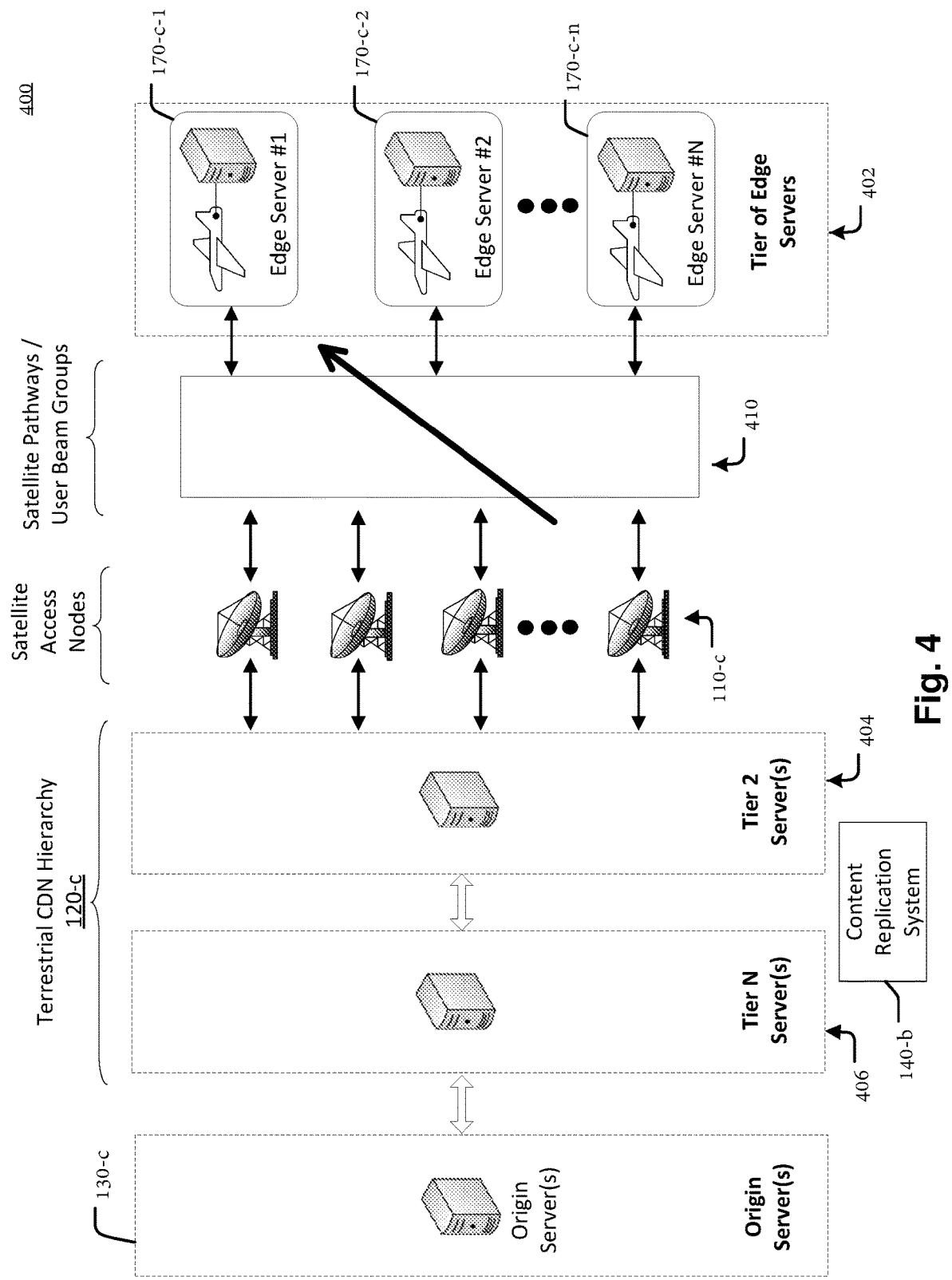
FIG. 4 shows a block diagram of an example terrestrial content delivery network hierarchy in a satellite communication environment, in accordance with various aspects of the present disclosure.

FIG. 4 shows a block diagram of an example content delivery network hierarchy 400 in a satellite communication environment, in accordance with various aspects of the present disclosure. The content delivery network hierarchy 400 includes an origin server 130-c, a terrestrial CDN hierarchy 120-c, a plurality of satellite access nodes 110-c, satellite pathways and user beam groups 410, and a tier of edge servers 402 (e.g., including edge server 170-c-1, 170-c-2, and 170-c-n). The origin server 130-c, the terrestrial CDN hierarchy 120-c, the plurality of satellite access nodes 110-c, the satellite pathways and user beam groups 410, and the tier of edge servers 402 may be examples of or include aspects of the terrestrial CDN hierarchy 120, the gateways 110, the satellite pathways 310, the user beam groups 320, the user beam/edge server links 330, and the edge servers 170 of FIGS. 1-3, respectively.

The servers within the CDN hierarchy 400 may be grouped into different tiers. For example, the tier of edge servers 402 that may be on-board aircraft may be organized into a first tier of the CDN hierarchy 400. The terrestrial CDN hierarchy 120-c may also be broken into one or more tiers, such as a second tier of servers 404 and an $N^{th}$ tier of servers 406. There may be any number of tiers of servers between the second tier of servers 404 and the $N^{th}$ tier of servers 406. The second tier of servers 404 and the $N^{th}$ tier of servers 406 may each include one or more servers that may store content items. A tier of servers may include servers that are geographically widespread.

When a content item is requested from a client device onboard an aircraft, the content delivery network hierarchy 400 may retrieve the content item from the closest tier of servers in terms of network proximity to the requesting client device that stores the content item. The content replication system 140-b may be used to manage content items within the content delivery network hierarchy 400. If the content item is stored on the edge server of the aircraft, the content replication system 140-b retrieves the content item from the closest in network proximity to the aircraft, which would be the edge server on the aircraft in the first tier of servers 402. If the content item is not stored onboard, the content replication system 140-*b* may proceed to look for the content item down the tiers of servers according to the hierarchy. For example, the content replication system 140-*b* may query the server in the second tier of servers 404 associated with the given edge server for the content item. If the server in the second tier of servers 404 contains the content item, the server in the second tier of servers 404 may provide the content item to the client device (e.g., via satellite access nodes 110-*c*). If the server in the second tier of servers 404 does not store the content item, the content replication system 140-*b* queries the associated server in the next tier of servers, which in the example of FIG. 4 is the $N^{th}$ tier of servers 406. If the associated server in the $N^{th}$ tier of servers 406 stores the content item, the associated server in the $N^{th}$ tier of servers 406 may provide the content item. If not, the content replication system 140-*b* proceeds to query the associated servers in subsequent tiers of servers.

There may be associations between the on-aircraft edge servers of the first tier of servers 402 and the satellite pathways/user beam groups 410 and between the satellite access nodes 110-*c* and the servers of the terrestrial CDN hierarchy 120-*c*. The associations between the on-aircraft edge servers of the first tier of servers 402 and the satellite pathways/user beam groups 410 may change as the aircraft travels along its flight path. In contrast to the frequently changing association between the on-aircraft edge-servers in the first tier of servers 402 and the satellite access nodes 110-*c* as the aircraft travels, the association between the satellite access nodes 110-*c* and the servers of the terrestrial CDN hierarchy 120-*c* may be fixed. In some examples, the association between the satellite access nodes 110-*c* and the servers of the terrestrial CDN hierarchy 120-*c* may not be fixed but may change relatively infrequently (e.g., due to network upgrades, reconfiguration, or maintenance). For example, the association between the satellite access nodes 110-*c* and the servers of the terrestrial CDN hierarchy 120-*c* may change less frequently than the association between the on-aircraft edge servers of the first tier of servers 402 and the satellite pathways/user beam groups 410.

Figure 5:
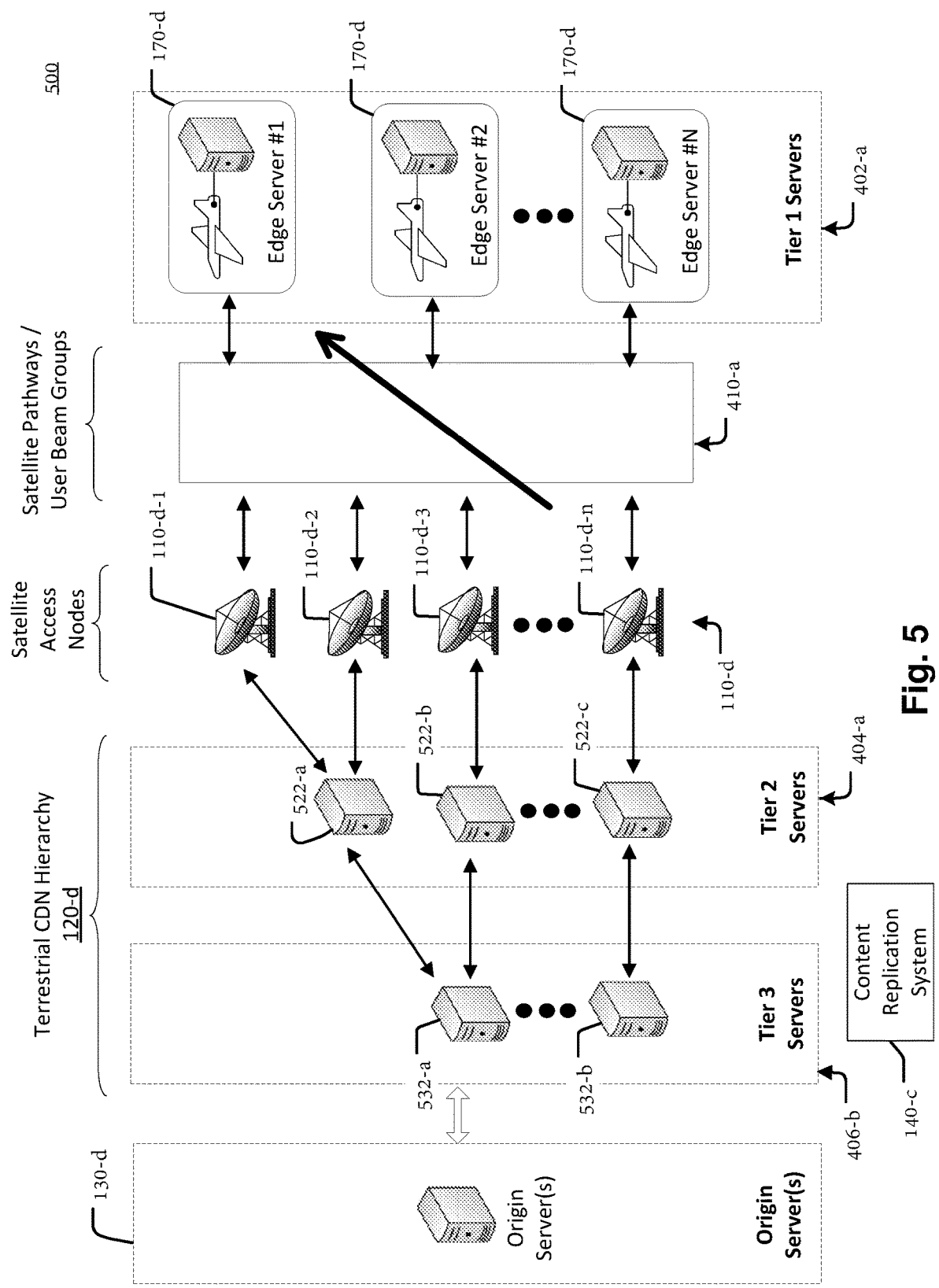
FIG. 5 shows a block diagram of an example terrestrial content delivery network hierarchy in a satellite communication environment, in accordance with aspects of the present disclosure.

FIG. 5 shows a block diagram of an example content delivery network hierarchy 500 in a satellite communication environment, in accordance with various aspects of the present disclosure. The content delivery network hierarchy 500 includes an origin server 130-*d*, a terrestrial CDN hierarchy 120-*d*, a plurality of satellite access nodes 110-*d*, satellite pathways and user beam groups 410-*a*, and a first tier 402-*a* of edge servers 170-*d*. The origin server 130-*d*, the terrestrial CDN hierarchy 120-*d*, the plurality of satellite access nodes 110-*d*, the satellite pathways/user beam groups 410-*a*, and the edge servers 170-*d* may be examples of or include aspects of the terrestrial CDN hierarchy 120, the satellite access nodes or gateways 110, the satellite pathways 310, the user beam groups 320, the user beam/edge server links 330, the first tier 402 of edge servers 170, the satellite pathways/user beam groups 410 of FIGS. 1-4, respectively.

The servers within the CDN hierarchy 500 may be grouped into different tiers, as in FIG. 4. For example, the tier of edge servers 170-*d* that may be on-board aircraft may be a first tier of servers 402-*a* in the CDN hierarchy 500. The terrestrial CDN hierarchy 120-*d* may also be arranged by one or more tiers, such as a second tier of servers 404-*a* and a third tier of servers 406-*a*. There terrestrial CDN hierarchy 120-*d* may contain additional tiers of servers than the two shown in FIG. 5. The terrestrial CDN hierarchy 120-*d* may also contain the origin server 130-*d*. The content replication system 140-*c* may be used to manage content items within the content delivery network hierarchy 500.

Each server of a given tier of servers may be associated with one server at a higher (e.g., N+1) tier of servers. For example, each server in the second tier of servers 404-*a* may be associated with one server of the third tier of servers 406-*b*, and so on. Each server of an $N^{th}$ tier of servers may be associated with one or more servers at a lower (e.g., N−1) tier of servers. In some cases, a given server may be associated with a server in a non-adjacent tier of servers. For example, a server in the second tier of servers 404-*a* may be associated with a server in a fourth tier of servers (e.g., where there may be no server in a third tier of servers in network proximity to the server in the second tier of servers).

For example, each edge server 170-*d* of the first tier of servers 402-*a* may be associated with one server 522 of the second tier of servers 404-*a*. The association of the edge servers 170-*d* with the servers 522 of the second tier of servers 404-*a* may be based on network proximity between the satellite access node 110-*d* serving the user beam providing service to the aircraft on which the edge server 170-*d* is located. For example, edge servers 170-*d* on board aircraft that are within user beams served by satellite access node 110-*d*-1 (e.g., via satellite pathways/user beam groups 410-*a*) may be associated with server 522-*a* of the second tier of servers 404-*a*. Servers 522 of the second tier of servers 404-*a* may be associated with edge servers 170-*d* in beam groups served by multiple satellite access nodes 110-*d*. For example, edge servers 170-*d* on board aircraft that are within user beams served by satellite access node 110-*d*-2 (e.g., via satellite pathways/user beam groups 410-*a*) may also be associated with server 522-*a* of the second tier of servers 404-*a*. As also illustrated in FIG. 5, edge servers 170-*d* on board aircraft that are within user beams served by satellite access nodes 110-*d*-3 and 110-*d*-*n* (e.g., via satellite pathways/user beam groups 410-*a*) may be associated with servers 522-*b* and 522-*n* of the second tier of servers 404-*a*, respectively.

Similarly, servers of the third tier of servers 406-*a* may each be associated with one server in a higher tier of servers and one or more servers in a lower tier of servers. For example, servers 522-*a* and 522-*b* of the second tier of servers 404-*a* are associated with server 532-*a* of the third tier of servers 406-*a* while server 522-*c* is associated with server 532-*b* of the third tier of servers 406-*a*. Each of the servers of a highest layer of terrestrial CDN hierarchy 120-*d* may be associated with the origin server 130-*d*. Thus, each branch of the terrestrial CDN hierarchy 120-*d* may terminate at the origin server 130-*d*. In some cases, the CDN hierarchy 120-*d* may represent network topology of the servers within the hierarchy. For example, servers of a given tier of servers may not communicate directly with one another or network connection topology for the CDN hierarchy 120-*d* may not include connections between servers of a given tier of servers.

The CDN DNS 244-*a* may use these associations when determining which server containing the content item is the closest in terms of network proximity to the requesting client device or on-aircraft edge server. The associations may be used to retrieve the content items.

FIG. 6 shows a process flow 600 of example content delivery routing for an on-aircraft edge server 170-*b*, in accordance with various aspects of the present disclosure. The process flow 600 includes an origin server 130-*e*, a CDN DNS 244-*b*, a second tier server 522-*db*, an edge server 170-*e*, an aircraft 160-*b*, and a client device 220-*c*.

The origin server 130-*e*, the CDN DNS 244-*a*, the second tier server 522-*d*, the edge server 170-*e*, the aircraft 160-*b*, and the client device 220-*c* may be examples of or include aspects of the origin server 130, the CDN DNS 244, the second tier server 522, the edge servers 170, the aircraft 160, and the client devices 220 or 222 of FIGS. 1-5, respectively. In some examples, the process flow 600 may be performed by at least a portion of the content delivery network hierarchies or the satellite communication environments described in FIGS. 1-5.

The process flow 600 shows actions taken by the different devices in rows, over time, as a request for a content item is processed. The process flow 600 provides an example of how a request for a content item may be generated, routed, processed, and fulfilled by one or more different servers. In particular, the process flow 600 shows how the request for a content item, Item A, may be routed through a content delivery network hierarchy. In this example, the CDN DNS 244-*a* may use a server index of a tier of edge servers and a second tier of servers to determine whether to return the network address of the edge server 170-*e*, a corresponding tier 2 server (e.g., second tier server 522-*d*), or the origin server 130-*e*. In the example of FIG. 6, only two tiers of servers are shown (the tier of edge servers and the second tier of servers). In other examples, there may be more than two tiers of servers.

The aircraft 160-*b* may include the edge server 170-*e* and the client device 220-*c*. The aircraft 160-*b* may include more than one client device, examples of which could be client devices 220 or 222 as described in FIG. 1. The client device 220-*c* initiates a request for content Item A, which may be a multimedia item, movie, game, show, live streamed event, or the like. At 602, a domain name system request is generated for Item A. The DNS request is forwarded to the CDN DNS 244-*a*. For example, the CDN DNS 244-*a* may be associated with a content provider for content Item A, and a request (e.g., HTTP request) for content Item A may be made to the content provider address.

At 604, the CDN DNS 244-*a* may determine the edge server 170-*b* located on the aircraft 160-*b*. The determination may include identifying the aircraft 160-*b*, and which edge server among a plurality of edge servers is located onboard the aircraft 160-*b*. Identifying the aircraft may include looking up a sending address of the request (which may be associated with the network access unit 214 which may encapsulate or perform NAT for the request). Identifying the edge server may include sending a query to the aircraft 160-*b*, consulting a database which indexes aircrafts and edge servers, or the like. The determination may further include determining a unique identifier of or a network address for the edge server 170-*b*.

At 606, the CDN DNS 244-*a* may determine whether Item A is stored in the edge server 170-*b*. If so, the CDN DNS 244-*a* may return the address of the edge server 170-*b* to the client device 220-*c* at 608. For example, the CDN DNS 244-*a* may send a redirect to the client device 220-*c* with the address of the edge server 170-*b*. At 620, the client device 220-*c* may request Item A from the edge server 170-*b*. The edge server 170-*b* may receive the request at 622 and provide Item A to the client device 220-*c*. Alternatively, the CDN DNS 244-*a* may send a message directly to edge server 170-*b*, which may then provide Item A to the client device 220-*c* as if coming from the address of the content provider or origin server 130-*e*. For example, the CDN DNS 244-*a* may provide the edge server 170-*b* with encryption or other information for responding directly to client device 220-*c* (e.g., secure sockets layer (SSL) certificate). At 624, the client device 220-*c* may receive Item A from the edge server 170-*b*. Upon receiving Item A, the client device 220-*c* may display or otherwise output Item A. In some examples, the client device 220-*c* may directly query the edge server 170-*b* for Item A.

Returning to 606, if the CDN DNS 244-*a* determines that Item A is not stored in the edge server 170-*e*, the process flow 600 proceeds to 630. At 630, the CDN DNS 244-*a* may determine an identity of a second tier server associated with the edge server 170-*e*. In this example, the second tier server 522-*d* is associated with the edge server 170-*e*. At 632, the CDN DNS 244-*a* determines whether Item A is stored in the second tier server 522-*d*. If so, the process flow 600 proceeds to 634 and the CDN DNS 244-*a* returns the address of the second tier server 522-*d* to the client device 220-*c* (e.g., in a redirect message). At 640, the client device 220-*c* receives the address of the second tier server 522-*d* and requests Item A from the second tier server 522-*d* at 642. Alternatively, the CDN DNS 244-*a* may send a message directly to second tier server 522-*d*, which may then provide Item A to the client device 220-*c* as if coming from the address of the content provider or origin server 130-*e*. For example, the CDN DNS 244-*a* may provide the second tier server 522-*d* with encryption or other information for responding directly to client device 220-*c* (e.g., SSL certificate). The second tier server 522-*d* may provide Item A to the client device 220-*c*. At 644, the client device 220-*c* may receive Item A from the second tier server 522-*d*. Upon receiving Item A, the client device 220-*c* may display or otherwise output Item A.

Returning to 632, if the CDN DNS 244-*a* determines that Item A is not stored in the second tier server 522-*d*, the process flow 600 proceeds to 650. At 650, the CDN DNS 244-*a* provides the address of the origin server 130-*e* to the client device 220-*c* (e.g., in a redirect message). At 652, the client device 220-*c* may request Item A from the origin server 130-*e* at 654. Alternatively, the CDN DNS 244-*a* may send a message directly to origin server 130-*e*, which may then provide Item A to the client device 220-*c* as if coming from the address of the content provider. For example, the CDN DNS 244-*a* may provide the origin server 130-*e* with encryption or other information for responding directly to client device 220-*c* (e.g., SSL certificate). The origin server 130-*e* may provide Item A to the client device 220-*c* at 656. Upon receiving Item A at 656, the client device 220-*c* may display or otherwise output Item A.

The example of FIG. 6 only shows a single tier of servers between the edge tier of servers and the origin server. However, in examples with additional tiers of servers, before the CDN DNS 244-*a* returns the address of the origin server 130-*e* to the client device 220-*c*, the CDN DNS 244-*a* may query the additional tiers of servers for Item A. Upon determining that a server of an additional tier of servers stores Item A, the CDN DNS 244-*a* may send the address of that server to the client device 220-*c* (e.g., in a redirect message), or instruct that server to respond to the request with Item A.

In some examples, another device onboard the aircraft besides the client device 220-*c* may be the recipient of the address of the server that stores Item A. For example, a satellite terminal, transceiver, modem, network access unit, edge server, or wireless access point may receive and process the address (e.g., acting as a proxy server for the client device 220-*c*).

An example of process flow 600 may include a method for use in a communication system that includes a content delivery network comprising an edge tier of servers located on mobile platforms served by wireless communication links of the communication system and at least one terrestrial tier of servers distributed geographically within the communication system. The process flow 600 may include receiving a request for a media content item from a device within a mobile platform served via a wireless communication link of the communication system. The process flow 600 may further include determining an identity of a mobile edge server located on the mobile platform based at least in part on a network address of the device associated with the request. The process flow 600 may determine whether the media content item is stored on the mobile edge server. When the media content item is stored on the mobile edge server, the process flow 600 may redirect the request for the media content item to the mobile edge server. When the media content item is not stored on the mobile edge server, the process flow 600 may determine whether the media content item is stored on a first terrestrial server of a first tier of servers of the at least one terrestrial tier of servers, the first terrestrial server being coupled with an access node (e.g., satellite access node) serving the mobile platform and associated with the mobile edge server for the content delivery network. When the media content item is stored on the first terrestrial server of the first tier of servers, the process flow 600 may include redirecting the request for the media content item to the first terrestrial server.

Figure 7:
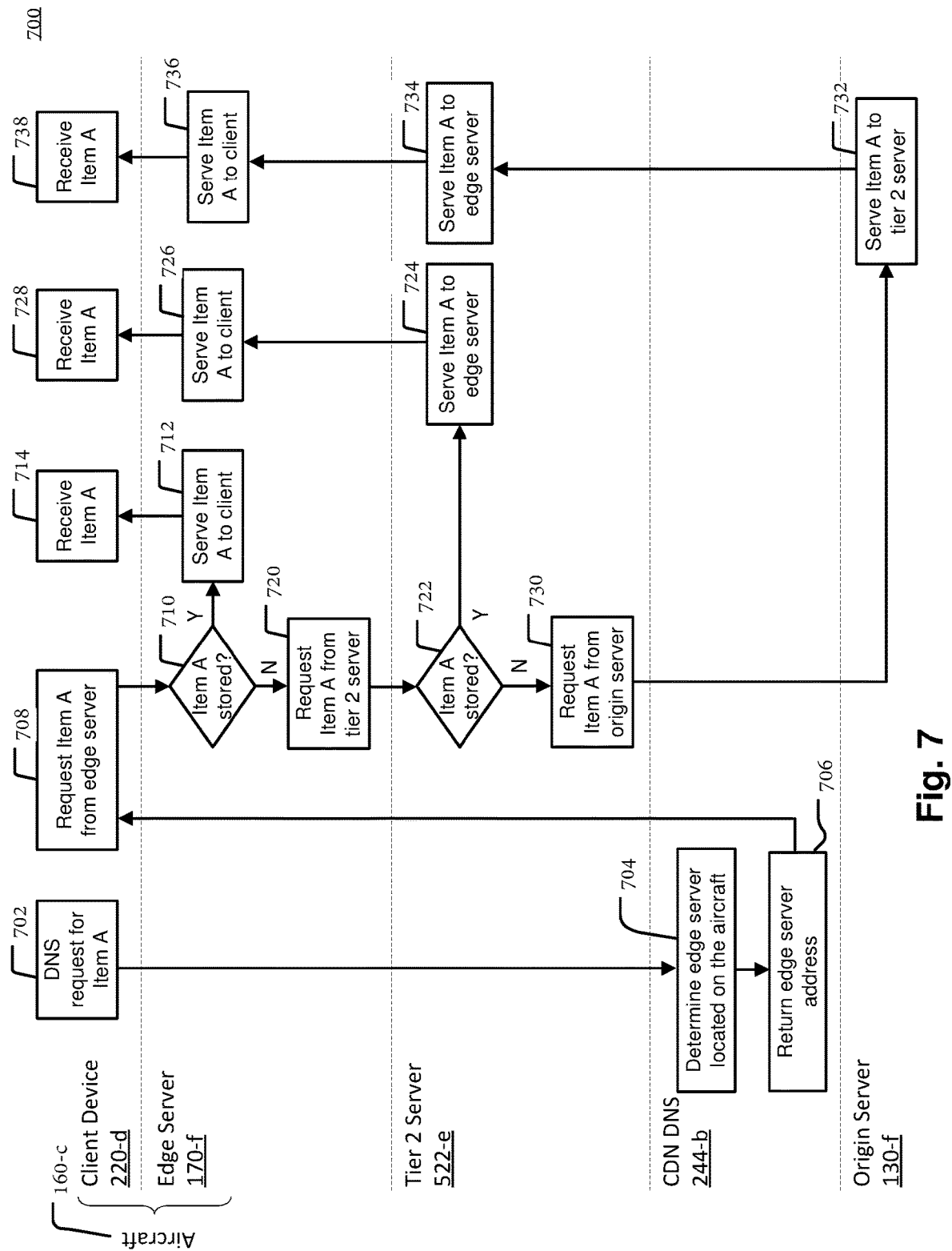
FIG. 7 shows a process flow of example content delivery routing with on-aircraft edge servers, in accordance with various aspects of the present disclosure.

FIG. 7 shows a process flow 700 of example content delivery routing with on-aircraft edge servers, in accordance with various aspects of the present disclosure. The process flow 700 includes an origin server 130-*f*, a CDN DNS 244-*b*, a second tier server 522-*e*, an edge server 170-*f*, an aircraft 160-*c*, and a client device 220-*d*. The origin server 130-*f*, the CDN DNS 244-*b*, the second tier server 522-*c*, the edge server 170-*f*, the aircraft 160-*c*, and the client device 220-*d* may be examples of or include aspects of the origin server 130, the CDN DNS 244, the second tier server 522, the edge servers 170, the aircraft 160, and the client devices 220 or 222 of FIGS. 1-6, respectively. In some examples, the process flow 700 may be performed by at least a portion of the content delivery network hierarchies or the satellite communication environments described in FIGS. 1-5.

The example of FIG. 7 shows how a request for a content item may be generated, routed, processed, and fulfilled by one or more different servers. In particular, the process flow 700 shows how the request for a content item, Item A, may be routed through a content delivery network hierarchy. In the process flow 700, the CDN DNS 244-*b* may always return the network address of the edge server 170-*f* to the client device 220-*d* when it receives a request for a content item from the client device 220-*d*. The edge server 170-*f* is then responsible for delivering the content item to the client device 220-*d*. In the example of FIG. 7, only two tiers of servers are shown (the tier of edge servers and the second tier of servers). Alternatively, there may be more than two tiers of servers.

The aircraft 160-*c* may include the edge server 170-*f* and the client device 220-*d*. The aircraft 160-*c* may include more than one client device, which could be client devices 220 or 222 as described in FIG. 1. The client device 220-*d* may initiate a request for at least a content Item A, which may be a movie, game, show, live streamed event, or the like. At 702, a domain name system request is generated for Item A. The DNS request is forwarded to the CDN DNS 244-*b*.

At 704, the CDN DNS 244-*b* may determine the edge server 170-*f* located on the aircraft 160-*c*. The determination may include identifying which edge server among a plurality of edge servers is on located onboard the aircraft 160-*c*, which may include sending a query to the aircraft 160-*c*, consulting a database which indexes aircrafts and edge servers, detecting an identifier for the edge server 170-*f* in the DNS request for Item A, or the like. The determination may further include determining a unique identifier of or a network address for the edge server 170-*f*.

At 706, the CDN DNS 244-*b* may return the address of the edge server 170-*f* to the client device 220-*d* (e.g., in a redirect message). At 708, in response to receiving the address for the edge server 170-*f*, the client device 220-*d* may request Item A from the edge server 170-*f*. The edge server 170-*f* may receive the request and determine whether it stores Item A at 710. If the edge server 170-*f* does store Item A, the edge server 170-*f* serves Item A to the client device 220-*d* at 712. At 714, the client device 220-*d* receives Item A from the edge server 170-*f*. Upon receiving Item A, the client device 220-*d* may display or otherwise output Item A. In some examples, the client device 220-*d* may directly query the edge server 170-*f* for Item A instead of going through a CDN DNS that is external to the aircraft 160-*c*. A direct query may be facilitated by a network access unit (e.g., network access unit 214) on board the aircraft 160-*c* (e.g., network access unit 214 may include a DNS resolver that may resolve the address of the query to the edge server 170-*f*).

Returning to 710, if the edge server 170-*f* determines that it does not store Item A, the process flow 700 proceeds to 720. At 720, the edge server 170-*f* may request Item A from a second tier server associated with the edge server 170-*f*. In this example, the second tier server 522-*e* is associated with the edge server 170-*f*. At 722, the second tier server 522-*e* determines whether it stores Item A. If so, the process flow 700 proceeds to 724 and the second tier server 522-*e* serves Item A to the edge server 170-*f*. At 726, the edge server 170-*f* may forward Item A to the client device 220-*d*. At 728, the client device 220-*d* receives Item A from the edge server 170-*f*. Upon receiving Item A, the client device 220-*d* may display or otherwise output Item A.

Returning to 722, if the second tier server 522-*e* determines that it does not store Item A, the process flow 700 proceeds to 730. At 730, the second tier server 522-*e* requests Item A from the origin server 130-*f*. In other examples with additional tiers of servers between the edge tier of servers and the origin server 130-*f*, the second tier server 522-*e* may query a next tier of servers for Item A before or instead of querying the origin server 130-*f*.

At 732, the origin server 130-*f* receives the request for Item A and serves Item A to the second tier server 522-*e*. At 734, the second tier server 522-*e* receives Item A and serves it to the edge server 170-*f*. The edge server 170-*f* may then serve Item A to the client device at 736. Upon receiving Item A at 738, the client device 220-*d* may display, output, or otherwise use Item A.

The example of FIG. 7 shows each server providing Item A to the adjacent server in the CDN hierarchy. Alternatively, the requesting server may provide the next server with the address of the edge server 170-*f* or the client device 220-*d*. In such an example, the server that stores Item A may directly send Item A to the edge server 170-*f* or the client device 220-*d*. For example, the origin server 130-*f* may serve Item A to the edge server 170-*f* directly (e.g., without going through the second tier server 522-*e*).

In some examples, rather than the edge server 170-*f* requesting Item A from the second tier server 522-*e* as in 720, the edge server 170-*f* could redirect the client device 220-*d* to the second tier server 522-*e*. However, some content items may involve a number of requests, and thus because of latency inherent in each round trip over a satellite network, this alternative may result in significant latency. In process flow 700, the edge server 170-*f* may reduce the number of requests by, for example, receiving all or different portions of a content item with each request. For example, when a single request that identifies a content item (e.g., a movie or other streaming content) is received at edge server 170-*f*, the edge server 170-*f* may request all or a significant portion of the content item from the second tier server 522-*e* and responding directly to the requests of the client device 220-*d*, thus not incurring latency for each request for smaller portions of the content item.

An example of process flow 700 may include a method for use in a communication system comprising a content delivery network comprising an edge tier of servers located on mobile platforms served by wireless communication links of the communication system and at least one terrestrial tier of servers distributed geographically within the communication system. The process flow 700 may include receiving, at a mobile edge server located on a mobile platform, a request for a media content item for a device within the mobile platform, wherein the request was redirected from a server of the content delivery network outside of the mobile platform. The process flow 700 may further include determining whether the media content item is stored at the mobile edge server and when the media content item is stored at the mobile edge server, providing the media content item to the device. When the media content item is not stored at the mobile edge server, the process flow 700 may query, via an access node serving the mobile platform via a wireless communication link, at least one terrestrial server of the at least one terrestrial tier of servers for the media content item, receive the media content item from the at least one terrestrial server, and provide the media content item to the device.

Figure 8:
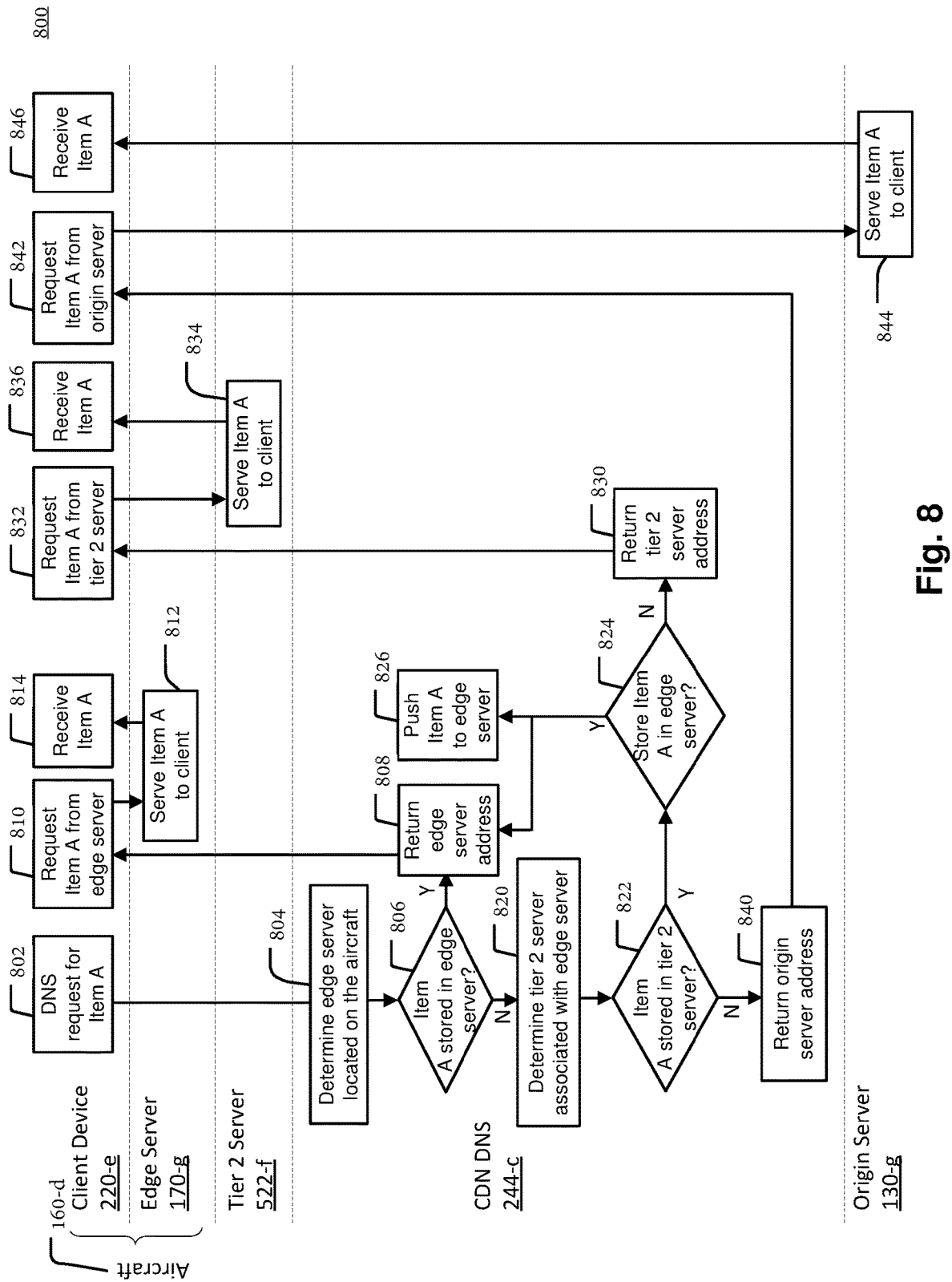
FIG. 8 shows a process flow of example content delivery routing with on-aircraft edge servers, in accordance with various aspects of the present disclosure.

FIG. 8 shows a process flow 800 of example content delivery routing with on-aircraft edge servers, in accordance with various aspects of the present disclosure. The process flow 800 includes an origin server 130-*g*, a CDN DNS 244-*c*, a second tier server 522-*f*, an edge server 170-*g*, an aircraft 160-*d*, and a client device 220-*e*. The origin server 130-*g*, the CDN DNS 244-*c*, the second tier server 522-*f*, the edge server 170-*g*, the aircraft 160-*d*, and the client device 220-*e* may be examples of or include aspects of the origin server 130, the CDN DNS 244, the second tier server 522, the edge servers 170, the aircraft 160, and the client devices 220 or 222 of FIGS. 1-7, respectively. In some examples, the process flow 800 may be performed by at least a portion of the content delivery network hierarchy or the satellite communication environments described in FIGS. 1-5.

The example of FIG. 8 shows how a request for a content item may be generated, routed, processed, and fulfilled by one or more different servers, as well as making decisions to store requested items in the various servers. In particular, the process flow 800 shows how the request for a content item, Item A, may be routed through a content delivery network hierarchy and store/no store decisions are made. In the process flow 800, the CDN DNS 244-*c* may return the network address of the edge server 170-*g* to the client device 220-*e* (e.g., in a redirect message) when it receives a request for a content item from the client device 220-*e*. The CDN DNS 244-*c* may also determine whether to store the content item on a particular server. In the example of FIG. 8, only two tiers of servers are shown (the tier of edge servers and the second tier of servers). Alternatively, there may be more than two tiers of servers.

The aircraft 160-*d* may include the edge server 170-*g* and the client device 220-*e*. The aircraft 160-*d* may include more than one client device, which could be client devices 220 or 222 as described in FIG. 1. The client device 220-*e* may initiate a DNS request for at least a content Item A, which may be a movie, game, show, live streamed event, or the like. At 802, a domain name system request is generated for Item A. The DNS request is forwarded to the CDN DNS 244-*c*. For example, the CDN DNS 244-*c* may be associated with a content provider for content Item A, and a request (e.g., HTTP request) for content Item A may be made to the content provider address.

At 804, the CDN DNS 244-*c* may determine the edge server 170-*g* located on the aircraft 160-*d*. The determination may include identifying the aircraft 160-*d* and which edge server among a plurality of edge servers is located onboard the aircraft 160-*d*, which may be performed as described above with reference to 604 of FIG. 6. At 806, the CDN DNS 244-*c* may determine whether the edge server 170-*g* stores Item A. If the edge server 170-*g* does store Item A, the CDN DNS 244-*c* may return the network address of the edge server 170-*g* to the client device 220-*e* at 808 (e.g., in a redirect message). At 810, the client device 220-*e* may receive the address of the edge server 170-*g* from the CDN DNS 244-*c* and may request Item A from the edge server 170-*g*. At 812, the edge server 170-*g* may serve Item A to the client device 220-*e*. Alternatively, the CDN DNS 244-*c* may send a message directly to edge server 170-*g*, which may then provide Item A to the client device 220-*e* as if coming from the address of the content provider or origin server 130-*g*. For example, the CDN DNS 244-*c* may provide the edge server 170-*g* with encryption or other information for responding directly to client device 220-*e* (e.g., SSL certificate). Upon receiving Item A at 814, the client device 220-*e* may use, display, or otherwise output Item A.

Returning to 806, if the CDN DNS 244-*c* determines that the edge server 170-*g* does not store Item A, the process flow 800 proceeds to 820. At 820, the CDN DNS 244-*c* may determine which the second tier server is associated with the edge server 170-*g*. In this example, the second tier server 522-*f* is associated with the edge server 170-*g*. At 822, the CDN DNS 244-*e* determines whether the second tier server 522-*f* stores Item A. If so, the process flow 800 proceeds to 824 where the CDN DNS 244-*c* determines whether to store Item A in the edge server 170-*g*. If the CDN DNS 244-*c* decides to store Item A in the edge server 170-*g*, the CDN DNS 244-*c* pushes Item A to the edge server 170-*g* at 826 or returns the edge server address to the client device 220-*e* at 808. Pushing Item A to the edge server 170-*g* may include instructing the server closest in network proximity to the edge server 170-*g* to forward Item A to the edge server 170-*g*. The edge server 170-*g* may store Item A. As shown in FIG. 8, the DNS 244-*c* makes the determination for each item of whether to store the item in the edge server 170-*g* at step 824. Alternatively, each item may be pushed from the terrestrial server where it is located (e.g., in this case tier 2 server 522-*f*) to the edge server 170-*g*. The edge server 170-*g* may then determine whether to store the item. This technique may be used for other items that may be stored at other tiers of the terrestrial CDN hierarchy.

Once Item A is instructed to be pushed or successfully pushed to the edge server 170-*g*, the CDN DNS 244-*c* may return the edge server address to the client device 220-*e* at 808. The process flow 800 may proceed along 810, 812, and 814 as described above with reference to 610, 612, and 614 of FIG. 6, respectively.

Factors that may be considered when determining whether to store Item A at the edge server may include how frequently Item A is or may be requested from client devices onboard aircraft 160-*d*, a storage size of Item A, network latency, network load, network traffic, a time of day, a popularity of Item A, a rating of Item A, a publication date of Item A, digital or other legal rights associated with Item A, available storage space at the edge server 170-g, network proximity of the closest server which currently stores Item A, a duration of a rest of the flight of the aircraft 160-d, among other factors. One or more of these factors may be used together to make the determination whether to store a content item or not at the edge server.

If the CDN DNS 244-c determines not to store Item A in the edge server at 824, the CDN DNS 244-d returns the network address of the second tier server 522-f to the client device 220-e at 830. At 832, the client device 220-e may request Item A from the second tier server 522-f. At 834, the second tier server 522-f serves Item A to the client device 220-e. Alternatively, the CDN DNS 244-d may send a message directly to second tier server 522-f, which may then provide Item A to the client device 220-e as if coming from the address of the content provider or origin server 130-g. For example, the CDN DNS 244-c may provide the second tier server 522-f with encryption or other information for responding directly to client device 220-e (e.g., SSL certificate). At 836, the client device 220-e may receive Item A from the second tier server 522-f. Upon receiving Item A, the client device 220-e may display or otherwise output Item A.

Returning to 822, if the second tier server 522-f determines that it does not store Item A, the process flow 800 proceeds to 840. At 840, the CDN DNS 244-c returns the network address of the origin server 130-g to the client device 220-e (e.g., in a redirect message). At 842, the client device 220-e may request Item A from the origin server 130-g. At 844, the origin server 130-g may serve Item A to the client device 220-e. At 846, the client device 220-e may receive Item A from the origin server 130-g. Upon receiving Item A, the client device 220-e may display or otherwise output Item A.

In addition to providing request routing, the process flow 800 enables the CDN hierarchy to determine whether content should be stored at different servers, and storing of content at an edge server 170 as part of serving the content to a requesting device. Storing an item at a server closer in network proximity to the requesting client device may reduce latency, improve speeds, reduce traffic for items that may be requested again, and the like.

Figure 9:
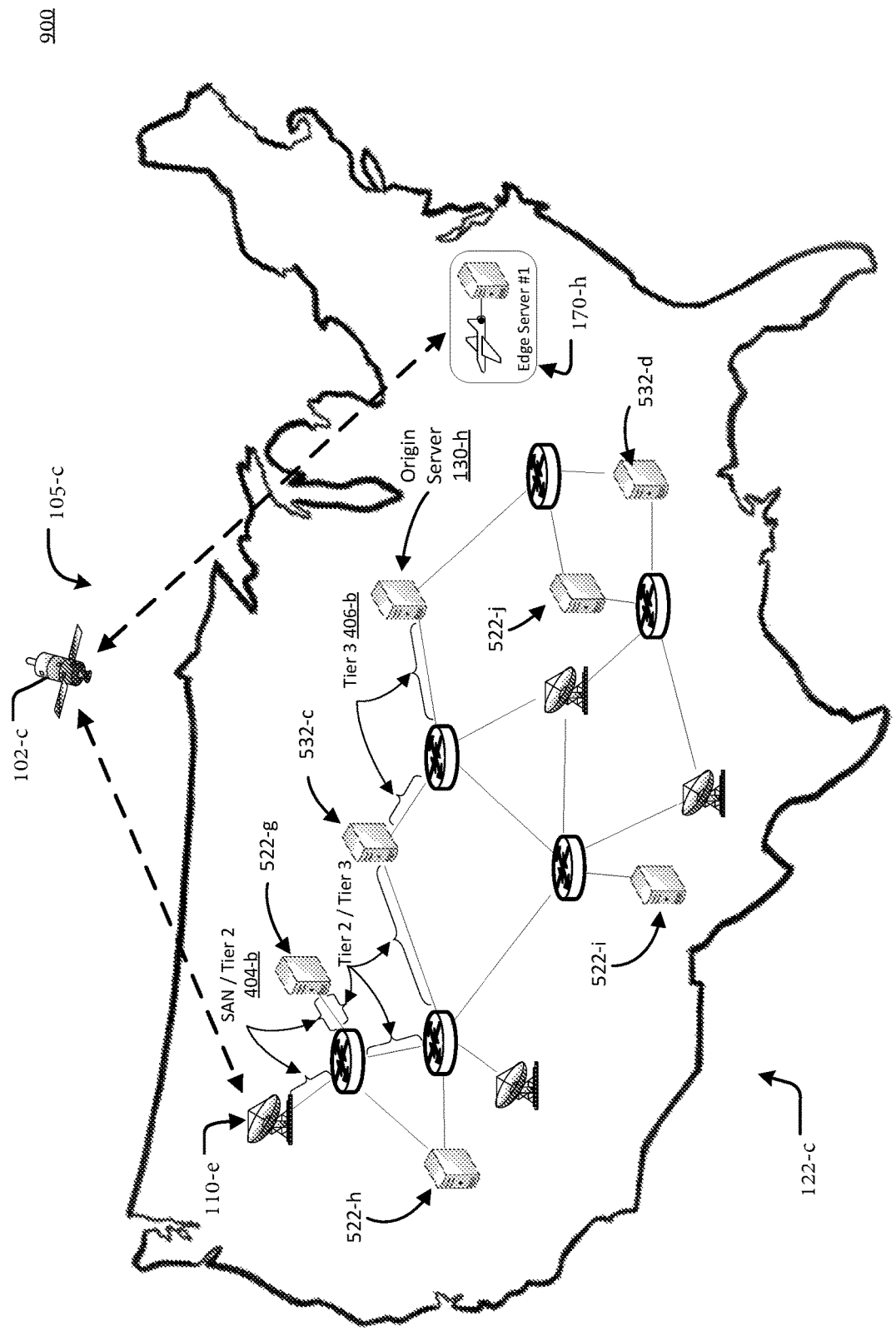
FIG. 9 shows a diagram of example content delivery routing with on-aircraft edge servers, in accordance with various aspects of the present disclosure.

FIG. 9 shows a map illustrating a communications environment 900 including an example content delivery network 122-c, in accordance with various aspects of the present disclosure. The communications environment 900 may include a satellite communication system 105-c, which may include satellite 102-c and a plurality of gateways 110-e. CDN 122-c may include an on-board edge server 170-h, an origin server 130-h, and two tiers of a terrestrial CDN. A first tier of the terrestrial CDN may be a second tier of servers including four servers 522-g, 522-h, 522-i, and 522-j (collectively referred to as second tier of servers 404-b). A second tier of the terrestrial CDN may be a third tier of servers including servers 532-c, 532-d (collectively referred to as third tier of servers 406-b). The satellite communication system 105-c, the plurality of gateways 110-e, the on-board edge server 170-h, the second tier of servers 404-b, the origin server 130-h, and the third tier of servers 406-b may be examples of or include aspects of the satellite communication system 105, the plurality of gateways 110, the on-board edge server 170, the origin server 130, the second tier of servers 404, and the third tier of servers 406 of FIGS. 1-8, respectively.

The map shows the CDN 122-c distributed throughout the continental United States, although in other examples, other regions may be included. In some examples, the CDN 122-c extends beyond international borders. The tiers of servers 404-b and 406-b may also be distributed geographically.

In the example of FIG. 9, the edge server 170-h is located on-board an aircraft over the eastern portion of the continental United States. The edge server 170-h is in communication with the satellite communication system 105-c. When a client device on-board the aircraft requests a media content item, the edge server 170-h sends a DNS request for the content item via the satellite communication system 105-c. In this example, the CDN 122-c determines that the closest server in terms of network proximity which has the requested content item is second tier server 522-g. The CDN 122-c provides the network address for the edge server 170-h or the second server tier server 522-g to the client device, as described herein.

As illustrated, the client device may receive the content item from a server located on the western side of the continental United States even though the aircraft is located on the eastern side and despite there being other satellite access nodes and servers physically closer to the aircraft. This is because the associations within the CDN hierarchy may be based on proximity to satellite access nodes that may communicate with the aircraft, not on the geographic locations of the aircraft. The proximity of the satellite access node serving the plane may be based on satellite pathways and user beam groups 320 (e.g., satellite pathways/user beam groups 410) as discussed with reference to FIGS. 3-5. That is, the physical location of the aircraft may not be very relevant to how the servers of the terrestrial CDN hierarchy are associated with the on-aircraft edge server 170-h. Rather, it may be based on proximity to the satellite access node that is in communication with the aircraft and thus with the on-aircraft edge server 170-h.

Figure 10A:
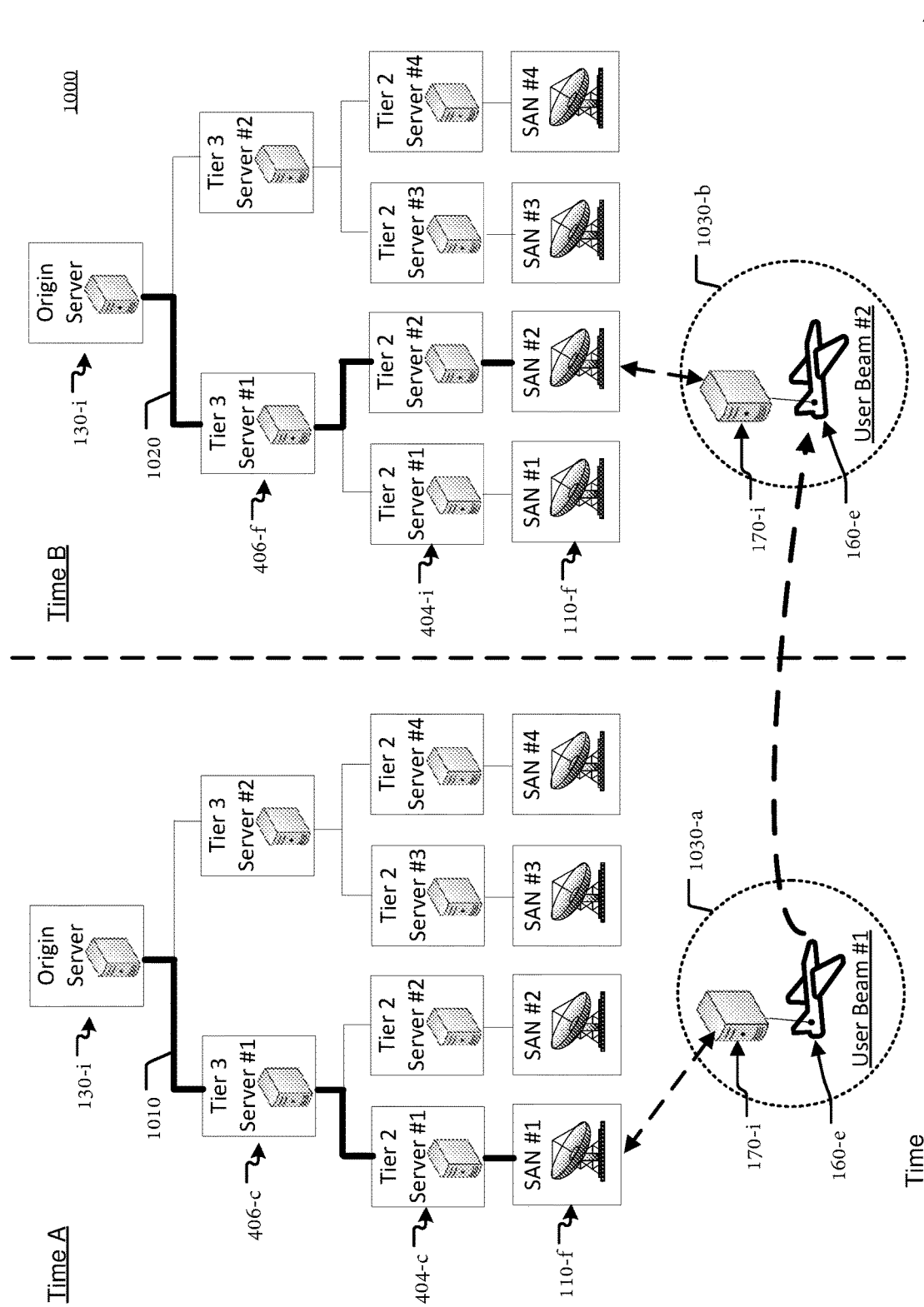
FIGS. 10A and 10B show a diagram of a network handoff in an example tier connection topology, in accordance with various aspects of the present disclosure.
Figure 10B:
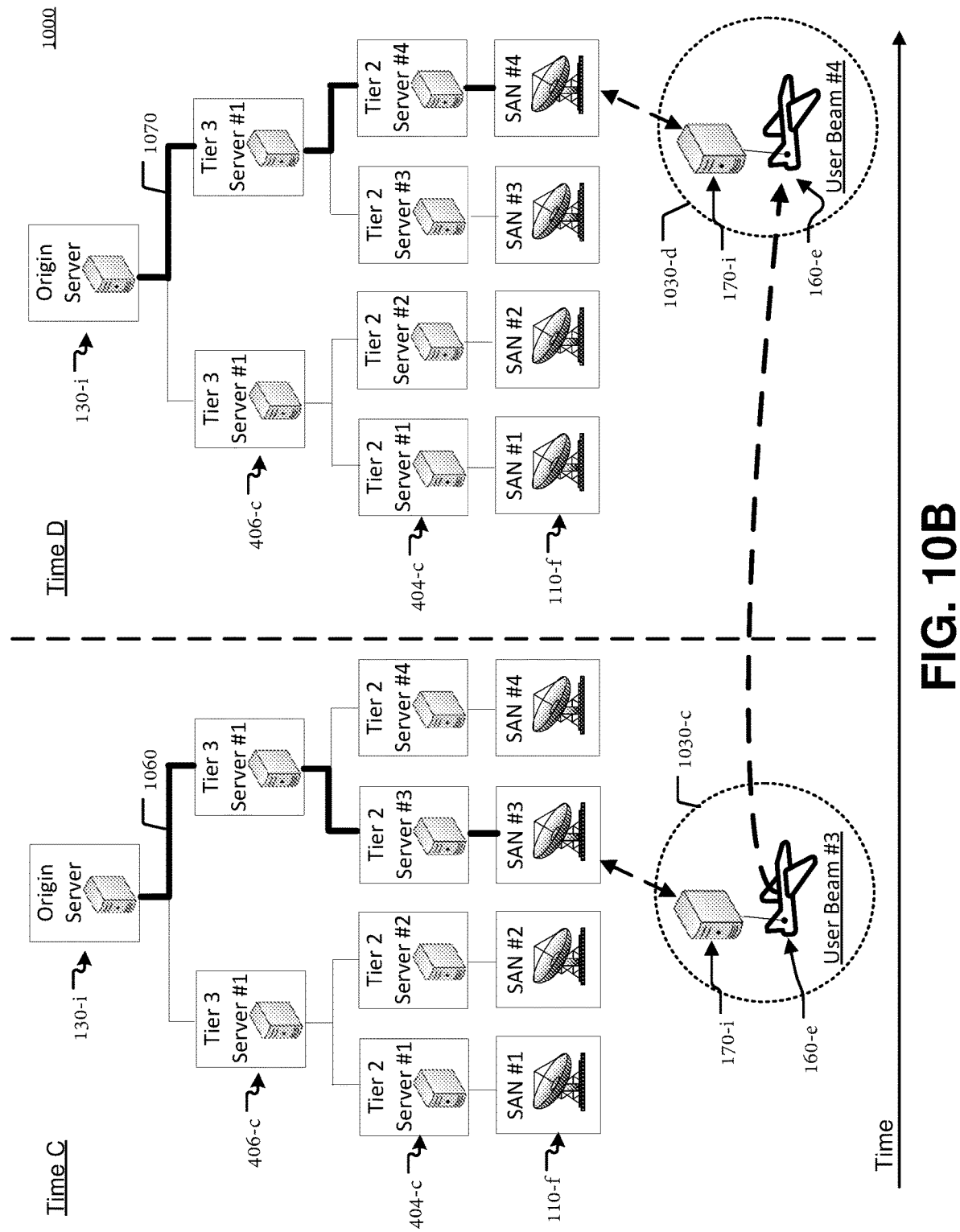

FIGS. 10A and 10B show an example handover of a communication link between a satellite terminal located on-board an aircraft and a plurality of satellite access nodes as the aircraft travels. FIG. 10A shows a diagram of a network handoff in an example tier connection topology 1000, in accordance with various aspects of the present disclosure. FIG. 10A follows an aircraft 160-e from a first time (Time A) to a second time (Time B) as it flies. FIG. 10B continues the flight of the aircraft 160-e from a third time (Time C) to a fourth time (Time D). The tier connection topology 1000 includes an aircraft 160-e, an on-board edge server 170-i, a plurality of satellite access nodes 110-f, a second tier of servers 404-c, a third tier of servers 406-c, and an origin server 130-i. The second tier of servers 404-c may include four servers as shown, and may be a first tier of a terrestrial CDN. The third tier of servers 406-c may include four servers as shown, and may be a second tier of a terrestrial CDN. The aircraft 160-e, an on-board edge server 170-i, plurality of satellite access nodes 110-f, second tier of servers 404-c, third tier of servers 406-c, and origin server 130-i may be examples of or include aspects of the aircraft 160, the edge server 170, the plurality of satellite access nodes 110, the second tier of servers 404, the third tier of servers 406, and the origin server 130 of FIGS. 1-9, respectively.

The tier connection topology 1000 shows a first satellite access node 110-f associated with a first server of the second tier of servers 404-c, which is associated with a first server of the third tier of servers 406-c, which is associated with the origin server 130-i. The tier connection topology 1000 also show a second satellite access node 110-f associated with a second server of the second tier of servers 404-c, which is associated with the first server of the third tier of servers 406-f. A third satellite access node 110-f is associated with a third server of the second tier of servers 404-c, which is associated with to a second server of the third tier of servers 406-c, which is associated with the origin server 130-i. Finally, a fourth satellite access network 110-f is associated with a fourth server of the second tier of servers 404-c, which is associated with the second server of the third tier of servers 406-c, which is in turn associated with the origin server 130-i. The tier connection topology 1000 is only one example network topology. As discussed herein, to be associated with for a CDN topology means that requests that are not able to be satisfied by the server are sent or redirected to the associated node or server. In other examples, other numbers of satellite access nodes, tiers of servers, and servers may be used. In some examples, different connections may be formed between the various nodes and servers.

At Time A, the aircraft 160-e is within a first user beam 1030-a. In this example, the first user beam 1030-a is associated with the first satellite access node 110-f. The associations of the terrestrial servers with the edge server 170-i may be determined by the tier network topology 1000. Here, because the aircraft 160-e is within the first user beam 1030-a, any DNS request originating from the aircraft 160-e will be routed through a network path 1010, represented by the dark line connecting the first satellite access node 110-f with the first server of the second tier of servers 404-c, then with the first server of the third tier of servers 406-c, and then with the origin server 130-i. This is an example of how the CDN DNS may route a DNS request throughout the tier connection topology 1000 when the aircraft 160-e is within the first user beam 1030-a.

At Time B, the aircraft 160-e has moved from being within the first user beam 1030-a to being within a second user beam 1030-b. In this example, the second user beam 1030-b is served via the second satellite access node 110-f. When the aircraft 160-e moves to being served via the second satellite access node 110-f, the association for edge server 170-i within the tier connection topology 1000 is changed from the first server to the second server of the second tier of servers 404-b. Thus, a DNS request originating from the aircraft 160-e while it is within the second user beam 1030-b will be routed through a network path 1020, represented by the dark line connecting the second satellite access node 110-f with the second server of the second tier of servers 404-c, then with the first server of the third tier of servers 406-c, and then with the origin server 130-i. This is an example of how the CDN DNS may route a DNS request throughout the tier connection topology 1000 when the aircraft 160-e is within the second user beam 1030-b.

FIG. 10B shows a diagram of a network handoff in an example tier connection topology 1000, in accordance with various aspects of the present disclosure. FIG. 10B follows the aircraft 160-e from Time B in FIG. 10A to Time C, then to Time D. The tier connection topology 1000 may be the same as described above with respect to FIG. 10A.

At Time C, the aircraft 160-e has moved from being within the second user beam 1030-b to being within a third user beam 1030-c. In this example, the third user beam 1030-c is served by the third satellite access node 110-f. When the aircraft 160-e moves to being served via the third satellite access node 110-f, the association for edge server 170-i within the tier connection topology 1000 is changed from the second server to the third server of the second tier of servers 404-b. A DNS request originating from the aircraft 160-e while it is within the third user beam 1030-c will be routed through a network path 1060, represented by the dark line connecting the third satellite access node 110-f with the third server of the second tier of servers 404-c, then with the second server of the third tier of servers 406-c, and then with the origin server 130-i. This is an example of how the CDN DNS may route a DNS request throughout the tier connection topology 1000 when the aircraft 160-e is within the third user beam 1030-c.

At Time D, the aircraft 160-e has moved from being within the third user beam 1030-c to being within a fourth user beam 1030-d. In this example, the fourth user beam 1030-d is associated with the fourth satellite access node 110-f. When the aircraft 160-e moves to being served via the fourth satellite access node 110-f, the association for edge server 170-i within the tier connection topology 1000 is changed from the third server to the fourth server of the second tier of servers 404-b. Any DNS request originating from the aircraft 160-e while it is within the fourth user beam 1030-d will be routed through a network path 1070, represented by the dark line connecting the fourth satellite access node 110-f with the fourth server of the second tier of servers 404-c, then with the second server of the third tier of servers 406-c, and then with the origin server 130-i. This is an example of how the CDN DNS may route a DNS request throughout the tier connection topology 1000 when the aircraft 160-e is within the fourth user beam 1030-d.

As shown in this example, the tier connection topology for the edge server may change over time as the aircraft moves among various user beams. Although described as dependent only on the particular satellite access node providing service to the current user beam, the association of the edge server 170-i may depend on additional factors such as loading at one or more of the terrestrial tiers of servers such as the second tier of servers 404-c or third tier of servers 406-c.

Figure 11:
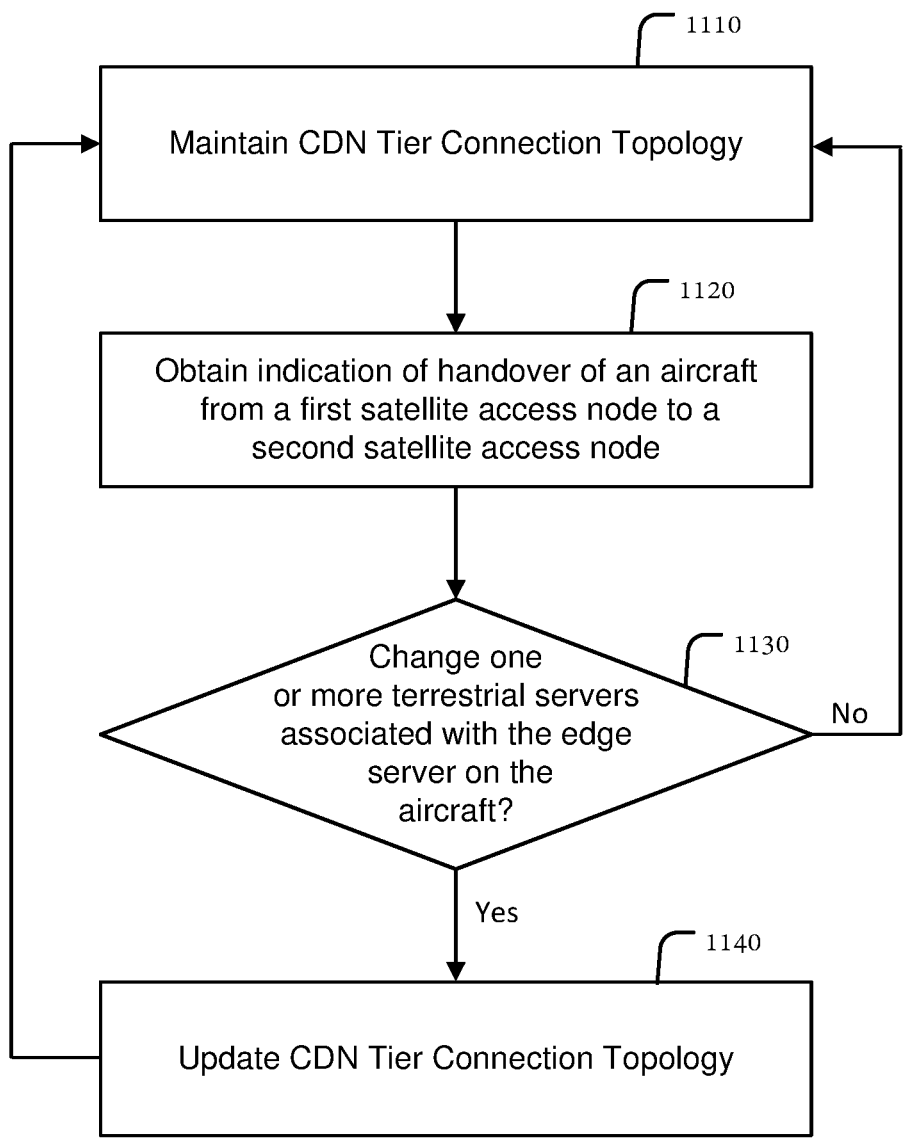
FIG. 11 shows a flowchart illustrating an example method of tier connection management, in accordance with aspects of the present disclosure.

FIG. 11 shows a flowchart illustrating an example method 1100 of tier connection management, in accordance with aspects of the present disclosure. Some or all of the steps of the example method 1100 may be performed by various devices of a satellite communication environment or CDN, for example one or more of a satellite terminal 112, a communications satellite 102 of a satellite communications system 105, a gateway or satellite access node 110, a CDN DNS 244, an edge server 170, or a client device 220, as described with reference to FIGS. 1-10B. In the description of method 1100, one or more devices of the satellite communication environment may perform each of the described steps. In some examples, one device of the satellite communication environment may perform the steps.

The method 1100 may show how tier connection management may be performed and updated as a mobile transportation vehicles move around a geographic region. At 1110, the method 1100 may include maintaining a CDN tier connection topology. The CDN tier connection topology may be determined based on associating tiers of edge servers with servers of a second tier of servers (e.g., first tier of terrestrial servers). For example, the CDN tier connection topology may be based on satellite access nodes providing service to current locations of the mobile transportation vehicles. The method 1100 may include maintaining the CDN tier connection topology for a particular mobile transportation vehicle, such as an aircraft.

At 1120, the method 1100 may include obtaining an indication of a handover of the aircraft from a first satellite access node to a second satellite access node. The handover may be indicated because the aircraft has moved from a first user beam associated with the first satellite access node to a second user beam associated with a second satellite access node. However, the aircraft may be in both the first and second user beams and still have a handover indicated, for example, based on different network conditions. In some examples, the satellite communication system may indicate the handover to the CDN. For example, the modem or network access unit on the aircraft, or the satellite access node, may notify the edge server of the aircraft or a terrestrial server or CDN DNS of the CDN when handover occurs.

At 1130, the method 1100 may include determining whether to change one or more terrestrial servers associated with the edge server on the aircraft. If method 1100 decides not to change the server, the method 1100 proceeds back to 1110 and maintains the CDN tier connection topology. One example for why the method 1100 may not change the server may include that the second satellite access node indicated in the handover is the same as the first satellite access node (e.g., the first and second user beams are served by the same satellite access node). Another reason may be that the servers are associated with multiple satellite access nodes in the topology. In other examples, other reasons may be used to maintain the CDN tier connection topology as it is (e.g., server loading).

Alternatively, if the method 1100 decides to change the server, the method 1100 proceeds to 1140. At 1140, the method 1100 updates the CDN tier connection topology. The method 1100 may change the CDN tier connection topology for reasons including, but not limited to, the aircraft being in a new user beam group served by the second satellite access node, where the second satellite access node is located in closer network proximity to a different server at a particular tier (e.g., the first terrestrial tier of servers) of the CDN.

Figure 12:
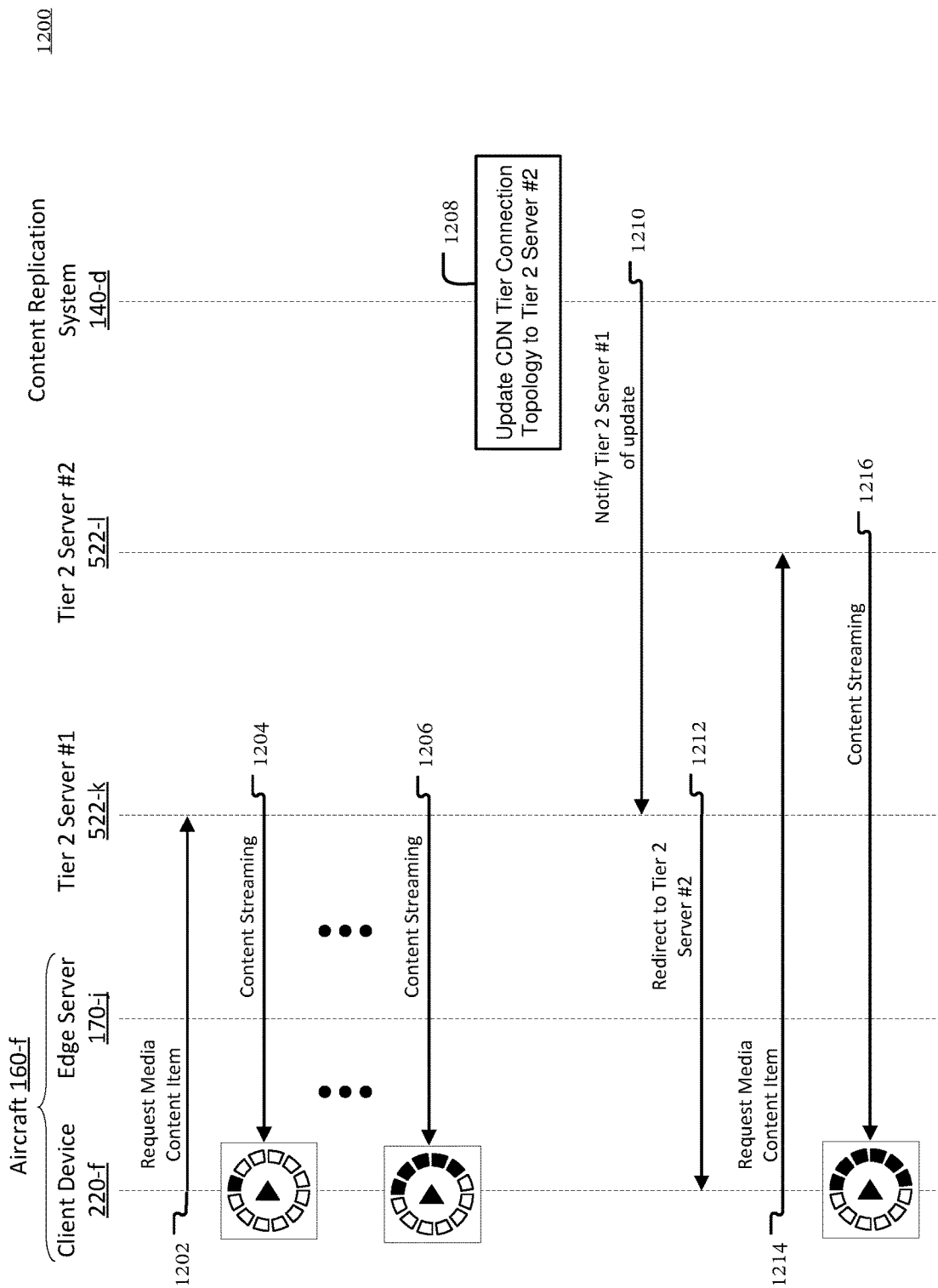
FIGS. 12 and 13 show flowcharts illustrating example methods for performing a handover during content delivery to an on-board client device, in accordance with aspects of the present disclosure.

FIG. 12 shows a flowchart illustrating an example method 1200 for performing a handover during content delivery to an on-board client device, in accordance with aspects of the present disclosure. Some or all of the steps of the example method 1200 may be performed by various devices of a satellite communication environment, for example one or more of a satellite terminal 112, a communications satellite 102 of a satellite communications system, a gateway 110, a content replication system 140-d, an edge server 170, or a client device 220, as described with reference to FIGS. 1-10B. FIG. 12 includes actions taken by a client device 220-f and an edge server 170-j onboard an aircraft 160-f, a first server 522-k of a second tier of servers, a second server 522-l of the second tier of servers, and the content replication system 140-d. The aircraft 160-f, client device 220-f, on-board edge server 170-k, servers 522-k and 522-l, and the content replication system 140-d may be examples of or include aspects of the aircraft 160, the edge server 170, the client device 220, the servers 522, and the content replication system 140 of FIGS. 1-9, respectively.

The method 1200 may include the client device 220-f requesting and obtaining a media content item from a content distribution network. In this example, the client device 220-f may communicate directly with the server that stores the desired media content item. At 1202, the client device 220-f may request a media content item. Based on a current location of the aircraft 160-f, a first tier two server 522-k may be the closest server in terms of network proximity to the aircraft 160-f that stores or otherwise has access to the media content item. At 1204, the first tier two server 522-k streams the media content item to the client device 220-f, and continues to stream it at 1206.

While the media content item is being streamed, the aircraft 160-f may fly into a region (e.g., a new user beam served by a new satellite access node) where the first tier two server 522-k is no longer the closest in terms of network proximity to the aircraft 160-f. At 1208, the content replication system 140-d may update the CDN tier connection topology to indicate that a second tier two server 522-l that stores or has access to the media content item is now the closest in network proximity to the aircraft 160-f. The content replication system 140-d may make this update because the network connection with the aircraft is being handed over to the second satellite access node because the aircraft 160-f has moved out of a user beam served by the first satellite access node. In another example, the content replication system 140-d may make this update for other reasons, such as the first tier two server 522-k no longer has access to the media content item or is experiencing a high network load.

At 1210, the content replication system 140-d may send a message to the first tier two server 522-k that the content replication system 140-d has made the update for the CDN tier connection topology. The message may instruct the first tier two server 522-k to inform the client device 220-f of the update or that the client device 220-f should request the media content item from the second tier two server 522-l. At 1212, the first tier two server 522-k may send a message (e.g., redirect message) to the client device 220-f to request the media content item from the second tier two server 522-l. At 1214, the client device 220-f requests the media content item from the second tier two server 522-l. At 1216, the second tier two server 522-l may stream the media content item to the client device 220-f.

Figure 13:
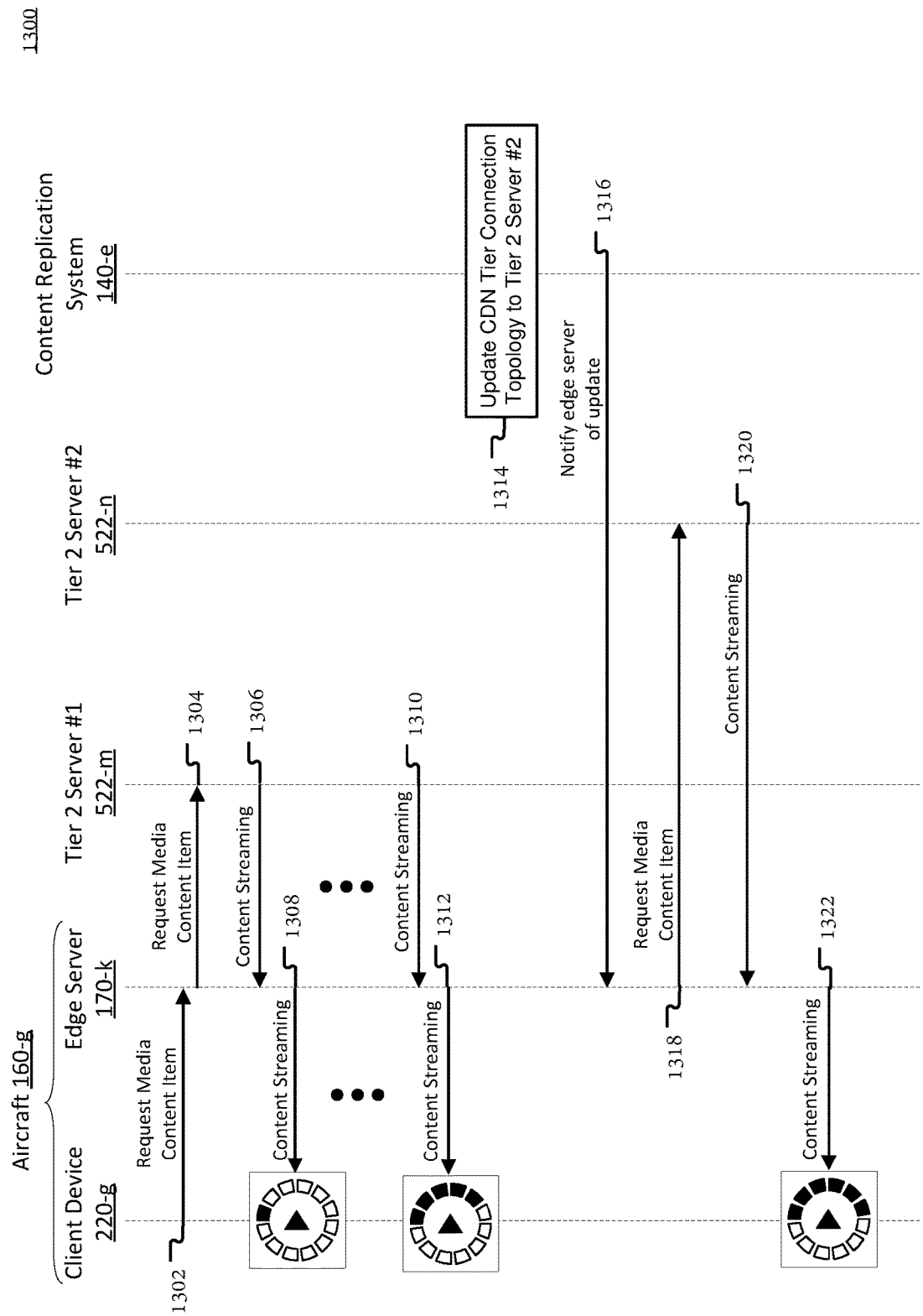

In some examples, buffering or other techniques may be performed to not interrupt the streaming of the media content item at the client device 220-f. In some examples, the edge server 170-j may perform the requests and receive any updates instead of the client device 220-f, as shown in FIG. 13. The method 1200 may be performed as many times as necessary throughout a flight of the aircraft 160-f.

FIG. 13 shows a flowchart illustrating an example method 1300 for performing a handover during content delivery to an on-board client device, in accordance with aspects of the present disclosure. Some or all of the steps of the example method 1300 may be performed by various devices of a satellite communication environment, for example one or more of a satellite terminal 112, a communications satellite 102 of a satellite communications system 105, a gateway or satellite access node 110, a content replication system 140, an edge server 170, or a client device 220, as described with reference to FIGS. 1-10B. FIG. 13 includes actions taken by a client device 220-g and an edge server 170-k onboard an aircraft 160-g, a first server 522-m of a second tier of servers, a second server 522-n of the second tier of servers, and a content replication system 140-e, which may be examples of or include aspects of the aircraft 160, the edge server 170, the client device 220, the servers 522, and the content replication system 140 of FIGS. 1-9 and 12, respectively.

The method 1300 may include the client device 220-g requesting and obtaining a media content item from a content distribution network and show a method for identifying a server for delivery of a media content item. In the example of method 1300, the client device 220-g communicates with the edge server 170-k to obtain a desired media content item. At 1302, the client device 220-g may request the media content item from the edge server 170-k. The edge server 170-k may determine which server in the CDN is closest in network proximity that stores the media content item. Based on a current location of the aircraft 160-g, a first tier two server 522-m may be the closest server in terms of network proximity that stores or otherwise has access to the media content item. The edge server 170-*k* may request the media content item from the first tier two server 522-*m* at 1304. At 1306, the first tier two server 522-*m* streams the media content item to the edge server 170-*k*, and continues to stream it at 1310. The edge server 170-*k* forwards the streaming data to the client device 220-*g* at 1308 and 1312.

While the media content item is being streamed, the aircraft 160-*g* may begin to fly out of the user beam region of a first satellite access node and a handover may be appropriate. At 1314, the content replication system 140-*d* may update the CDN tier connection topology to indicate that a second tier two server 522-*n* that stores or has access to the media content item is now the closest in network proximity to the aircraft 160-*g* (e.g., based on the aircraft 160-*g* being served by a second satellite access node). At 1316, the content replication system 140-*e* may send a message to the edge server 170-*k* that the content replication system 140-*e* has made the update for the CDN tier connection topology. The message may inform the edge server 170-*k* to request the media content item from the second tier two server 522-*n*. At 1318, the edge server 170-*k* may request the media content item from the second tier two server 522-*n*. At 1320, the second tier two server 522-*n* begins to stream the media content item to the edge server 170-*k*. At 1322, the edge server 170-*k* forwards the streaming data to the client device 220-*g*.

Figure 14:
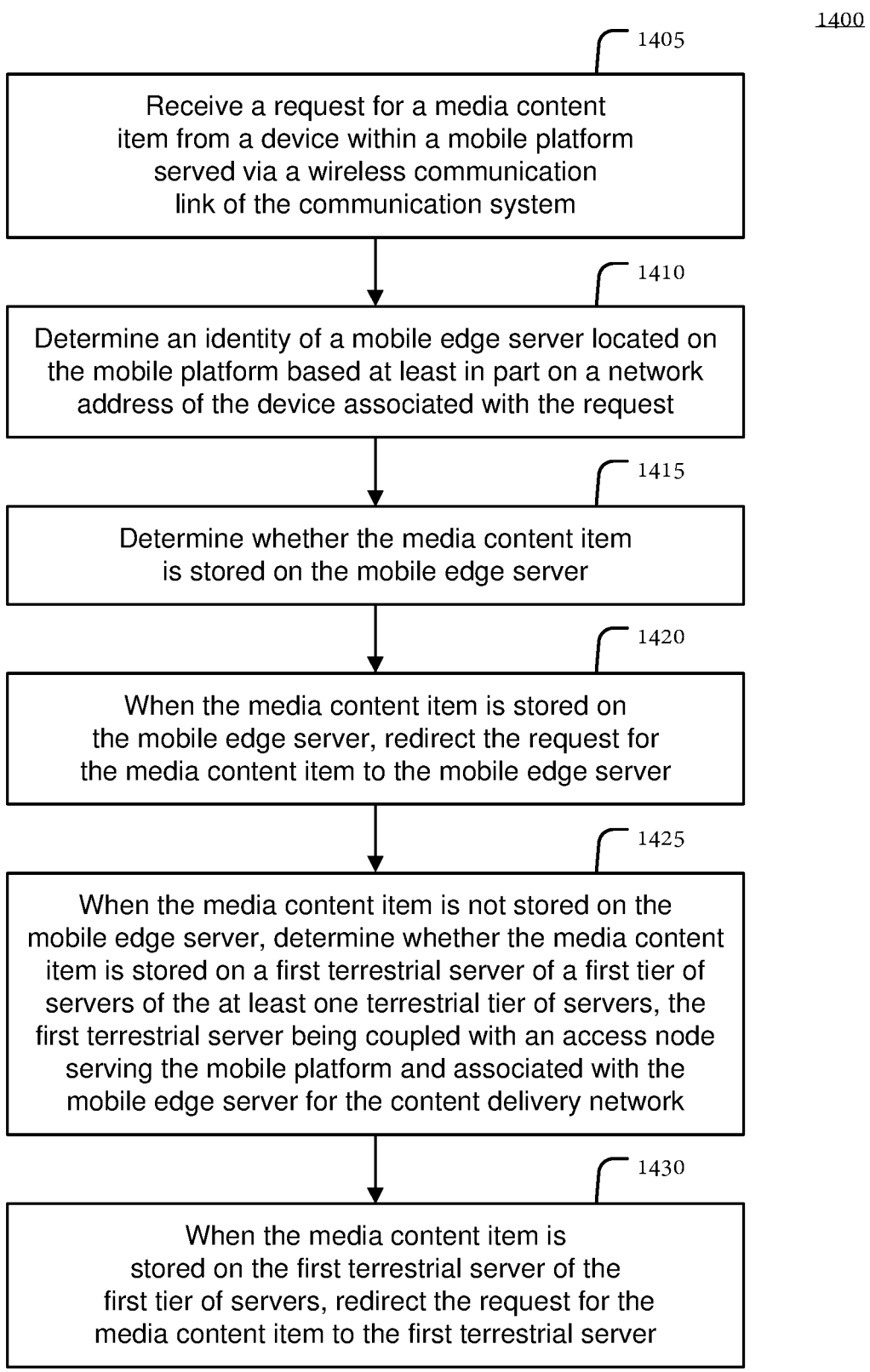
FIGS. 14 through 16 show flowcharts illustrating example methods for content delivery routing with on-aircraft edge servers, in accordance with various aspects of the present disclosure.

FIG. 14 shows a flowchart illustrating a method 1400 that supports content delivery routing with on-aircraft edge servers in accordance with aspects of the present disclosure. The operations of method 1400 may be implemented by a content delivery network or its components as described herein. For example, the operations of method 1400 may be performed by a CDN as described with reference to FIGS. 1-13. In some examples, a CDN may execute a set of instructions to control the functional elements of the CDN to perform the functions described below. Additionally or alternatively, a CDN may perform aspects of the functions described below using special-purpose hardware.

At 1405, the CDN may receive a request for a media content item from a device within a mobile platform served via a wireless communication link of the communication system. For example, the CDN may receive a media content request from a client device or an edge server. At 1410, the CDN may determine an identity of a mobile edge server located on the mobile platform based on a network address of the device associated with the request.

At 1415, the CDN may determine whether the media content item is stored on the mobile edge server. In some examples, determining whether the media content item is stored on the mobile edge server located within the mobile platform further includes querying a server index that identifies one or more media content items stored on one or more servers including the mobile edge server. In other examples, determining whether the media content item is stored on the mobile edge server further includes sending a request to the mobile edge server to check if the media content item is stored on the mobile edge server and receiving a message from the mobile edge server indicating whether the media content item is stored at the mobile edge server.

At 1420, the CDN may, when the media content item is stored on the mobile edge server, redirect the request for the media content item to the mobile edge server. In some examples, redirecting the request for the media content item to the mobile edge server further includes providing an address of the mobile edge server to the device in response to the request for the media content item. In other examples, redirecting the request for the media content item to the mobile edge server may include sending an instruction to the mobile edge server to provide the media content item in response to the request for the media content item.

At 1425, the CDN may, when the media content item is not stored on the mobile edge server, determine whether the media content item is stored on a first terrestrial server of a first tier of servers of the at least one terrestrial tier of servers, the first terrestrial server being coupled with an access node serving the mobile platform and associated with the mobile edge server for the content delivery network.

At 1430, the CDN may, when the media content item is stored on the first terrestrial server of the first tier of servers, redirect the request for the media content item to the first terrestrial server.

In some examples, when the media content item is not stored on the first terrestrial server, the method 1400 may include determining whether the media content item is stored on a second terrestrial server of a second tier of servers of the at least one terrestrial tier of servers, wherein the second terrestrial server is associated with the first terrestrial server. When the media content item is stored on the second terrestrial server, the method may include redirecting the request for the media content item to the second terrestrial server. In some examples when the media content is not stored on the second terrestrial server, the method 1400 may include redirecting the request for the media content item to an origin server of the content delivery network.

In some examples, the method 1400 may include mapping the request for the media content item to a proxy server associated with the access node of the wireless communication link serving the mobile platform. In other examples, the method 1400 may include when the media content item is not stored at the mobile edge server, sending the media content item to the mobile edge server for storage on the mobile edge server. In other examples, wherein the access node of the wireless communication link serving the mobile platform is a first access node, the method further includes determining that the mobile platform has transitioned to being served by a second access node and updating the association of the mobile edge server for the content delivery network to be associated with a second terrestrial server coupled with the second access node.

The operations of 1405, 1410, 1415, 1420, 1425, and 1430 may be performed according to the methods described herein. In some examples, aspects of the operations of 1405, 1410, 1415, 1420, 1425, and 1430 may be performed by a CDN as described with reference to FIGS. 1-13. In some examples, the CDN includes components (e.g., content replication system 140) that include a memory and processor which may perform the method 1400 described herein. For example, the memory may include instructions which, when executed by the processor, cause the processor to perform the method 1400.

Figure 15:
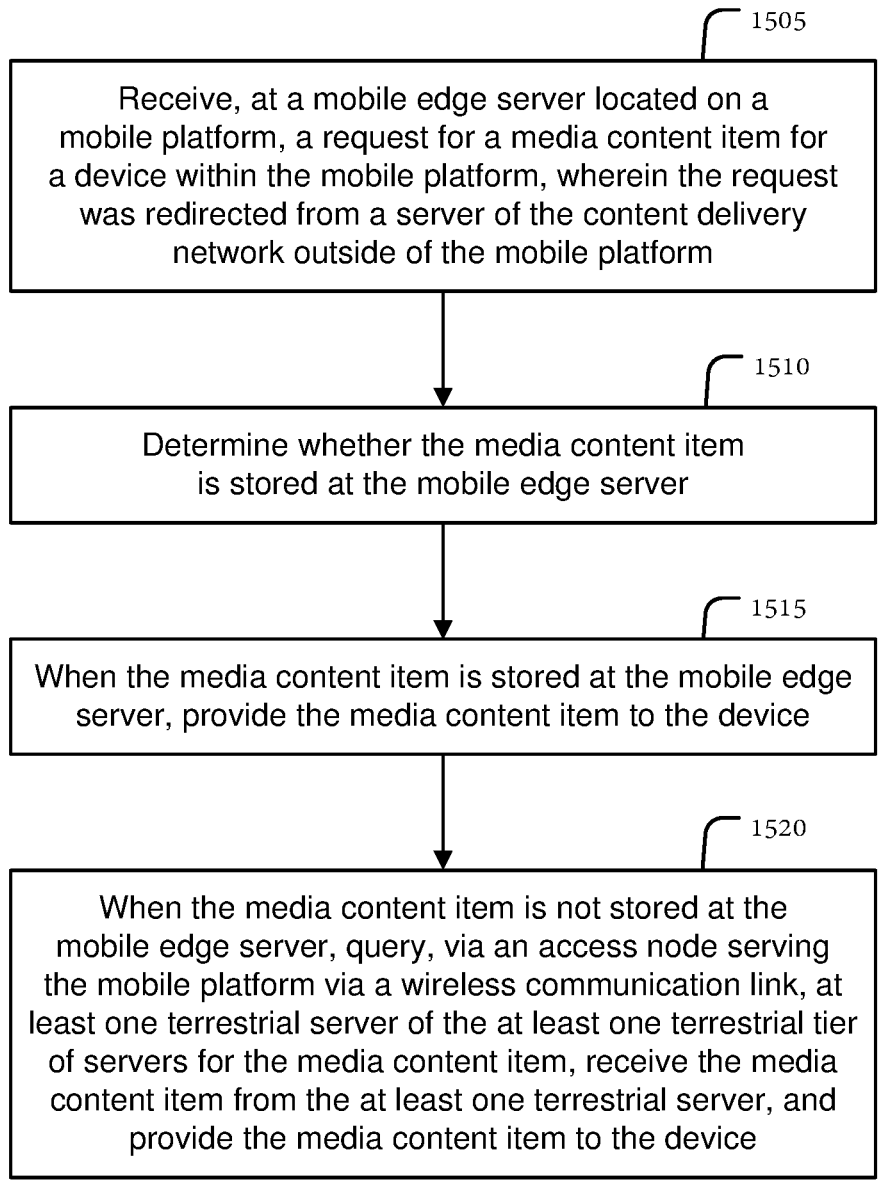

FIG. 15 shows a flowchart illustrating a method 1500 that supports content delivery routing with on-aircraft edge servers in accordance with aspects of the present disclosure. The operations of method 1500 may be implemented by an edge server or its components as described herein. For example, the operations of method 1500 may be performed by an edge server as described with reference to FIGS. 1-13. The edge server may be located on a mobile platform (e.g., an aircraft). In some examples, the edge server may execute a set of instructions to control the functional elements of the edge server to perform the functions described below. Additionally or alternatively, the edge server may perform aspects of the functions described below using special-purpose hardware.

At 1505, the edge server may receive, a request for a media content item for a device within the mobile platform, where the request was redirected from a server of the content delivery network outside of the mobile platform. At 1510, the edge server may determine whether the media content item is stored at the mobile edge server. At 1515, the edge server may provide the media content item to the device when the media content item is stored at the mobile edge server.

At 1520, the edge server may, when the media content item is not stored at the mobile edge server, query, via an access node serving the mobile platform via a wireless communication link, at least one terrestrial server of the at least one terrestrial tier of servers for the media content item, receive the media content item from the at least one terrestrial server, and provide the media content item to the device.

In some examples, querying the at least one terrestrial server includes querying a first terrestrial server of a first tier of servers of the at least one terrestrial tier of servers for the media content item, the first terrestrial server being coupled with the access node serving the mobile platform and associated with the mobile edge server for the content delivery network, receiving the media content item from the first terrestrial server when the media content item is stored at the first terrestrial server, and receiving a message indicating that the media content item is not stored at the first terrestrial server when the media content item is not stored at the first terrestrial server.

In other examples, querying the at least one terrestrial server includes querying, when the media content item is not stored at the first terrestrial server, a second terrestrial server of a second tier of servers of the at least one terrestrial tier of servers for the media content item, wherein the second terrestrial server is associated with the first terrestrial server for the content delivery network, receiving the media content item from the second terrestrial server when the media content item is stored at the second terrestrial server, and receiving a message indicating that the media content item is not stored at the second terrestrial server when the media content item is not stored at the second terrestrial server. Querying the at least one terrestrial server may further include querying, when the media content item is not stored at the second terrestrial server, an origin server of the content delivery network for the media content item and receiving the media content item from the origin server.

In some examples, the method 1500 may include responsive to receiving the media content item from the at least one terrestrial server, storing the media content item at the mobile edge server.

The operations of 1505, 1510, 1515, and 1520 may be performed according to the methods described herein. In some examples, aspects of the operations of 1505, 1510, 1515, and 1520 may be performed by an edge server as described with reference to FIGS. 1-13. In some examples, the edge server includes a memory and processor which may perform the method 1400 described herein.

Figure 16:
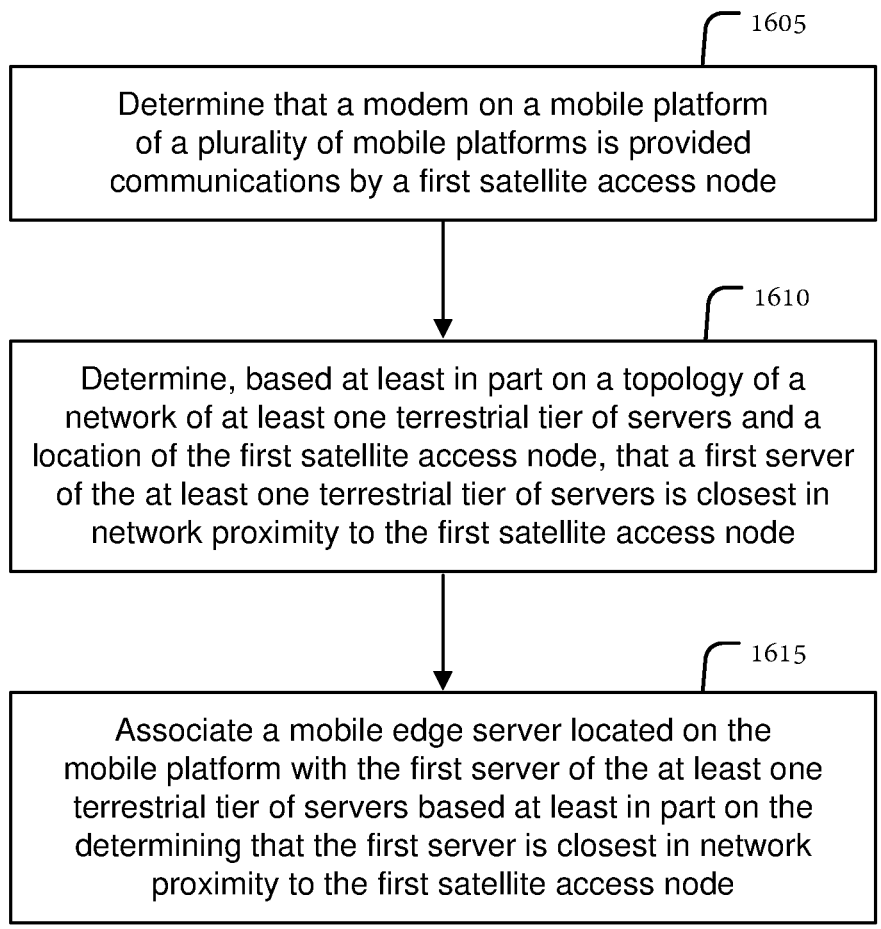

FIG. 16 shows a flowchart illustrating a method 1600 that supports content delivery routing with on-aircraft edge servers in accordance with aspects of the present disclosure. The operations of method 1600 may be implemented by a device in a content delivery network or its components as described herein. For example, the operations of method 1600 may be performed by a CDN, an edge server, or a satellite node, as described with reference to FIGS. 1-13. In some examples, the device in the CDN may execute a set of instructions to control the functional elements of the device to perform the functions described below. Additionally or alternatively, the device may perform aspects of the functions described below using special-purpose hardware.

At 1605, the device may determine that a modem on the mobile platform of the set of mobile platforms is provided communications via a first satellite beam served by a first satellite access node. At 1610, the device may determine, based on a topology of a network of the at least one terrestrial tier of servers and a location of the first satellite access node, that a first server of the at least one terrestrial tier of servers is closest in network proximity to the first satellite access node.

At 1615, the device may associate a mobile edge server located on the mobile platform with the first server of the at least one terrestrial tier of servers based on the determining that the first server is closest in network proximity to the first satellite access node.

In some examples, the method 1600 may include obtaining an indication of a handover of the modem on the mobile platform from being provided the communications by the first satellite access node to being provided the communications by a second satellite access node. The method 1600 may also include determining, based at least in part on the topology of the network of the at least one terrestrial tier of servers and a location of the second satellite access node, that a second server of the at least one terrestrial tier of servers is closer in network proximity to the first satellite access node than the first server and associating the mobile edge server with the second server based at least in part on the determining that the second server is closer in network proximity than the first server.

In some examples of the method 1600, the mobile platform is located at a first location and the first location is geographically closer to a second server of the terrestrial tier of servers.

The method 1600 may include determining a group of satellite beams associated with the first satellite access node; and selecting the first satellite access node to communicate with the mobile edge server located on the mobile platform based at least in part on the first satellite beam being a member of the group of satellite beams. In some examples, the method includes associating each of the edge tier of servers with respective servers of the terrestrial tier of servers based at least in part on a topology of a network of the at least one terrestrial tier of servers and locations of respective serving satellite access nodes of a plurality of satellite access nodes of the communication system.

In some examples, the method 1600 includes receiving a request for a media content item from the mobile edge server located on the mobile platform and forwarding the request for the media content item to the first server of the at least one terrestrial tier of servers. Some examples may include receiving the media content item from the first server of the at least one terrestrial tier of servers and forwarding the media content item to the mobile edge server located on the mobile platform. Further examples may include receiving the media content item from a second server of the at least one terrestrial tier of servers or an origin server of the at least one terrestrial tier of servers and forwarding the media content item to the mobile edge server located on the mobile platform. The method 1600 may include receiving the media content item from an origin server of the at least one terrestrial tier of servers and forwarding the media content item to the mobile edge server located on the mobile platform.

The operations of 1605, 1610, and 1615 may be performed according to the methods described herein. In some examples, aspects of the operations of 1605, 1610, and 1615 may be performed by a network device as described with reference to FIGS. 1-13. In some examples, the CDN includes components (e.g., content replication system 140) that include a memory and processor which may perform the method 1400 described herein. In other examples, an edge server or a satellite node includes a memory and processor which may perform the method 1400 described herein.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical positions. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for use in a communication system comprising a content delivery network comprising an edge tier of servers located on mobile platforms served by wireless communication links of the communication system and two or more terrestrial tiers of servers distributed geographically within the communication system, the method comprising:
   receiving a request for a media content item from a device within a mobile platform served via a wireless communication link of the communication system;
   determining an identity of a mobile edge server located on the mobile platform based at least in part on a network address of the device associated with the request;
   determining whether the media content item is stored on the mobile edge server;

when the media content item is stored on the mobile edge server, redirecting the request for the media content item to the mobile edge server;

when the media content item is not stored on the mobile edge server, determining whether the media content item is stored on a first terrestrial server of a first tier of servers of the two or more terrestrial tiers of servers, the first terrestrial server being coupled with a first access node serving the mobile platform and associated with the mobile edge server for the content delivery network;

when the media content item is stored on the first terrestrial server of the first tier of servers, redirecting the request for the media content item to the first terrestrial server;

determining that the mobile platform has transitioned to being served by a second access node while the mobile platform is in transit;

determining that the second access node is associated with a second terrestrial server of the first tier of servers of the two or more terrestrial tiers of servers based at least in part on a topology of the two or more terrestrial tiers of servers and a location of an exchange point between a ground network serving the second access node and the topology of the two or more terrestrial tiers of servers; and updating the association of the mobile edge server for the content delivery network to be associated with the second terrestrial server based at least in part on the transition of the mobile platform to being served by the second access node and the determined association between the second access node and the second terrestrial server.

2. The method of claim 1, further comprising:
when the media content item is not stored on the first terrestrial server:
determining whether the media content item is stored on the second terrestrial server, wherein the second terrestrial server is of a second tier of servers of the two or more terrestrial tiers of servers, wherein the second terrestrial server is associated with the first terrestrial server; and
when the media content item is stored on the second terrestrial server, redirecting the request for the media content item to the second terrestrial server.

3. The method of claim 2, further comprising:
when the media content item is not stored on the second terrestrial server, redirecting the request for the media content item to an origin server of the content delivery network.

4. The method of claim 1, wherein redirecting the request for the media content item to the mobile edge server comprises:
providing an address of the mobile edge server to the device in response to the request for the media content item.

5. The method of claim 1, wherein redirecting the request for the media content item to the mobile edge server comprises:
sending an instruction to the mobile edge server to provide the media content item in response to the request for the media content item.

6. The method of claim 1, wherein determining whether the media content item is stored on the mobile edge server located within the mobile platform further comprises:
querying a server index that identifies one or more media content items stored on at least the mobile edge server.

7. The method of claim 1, wherein determining whether the media content item is stored on the mobile edge server further comprises:
sending a request to the mobile edge server to check if the media content item is stored on the mobile edge server; and
receiving a message from the mobile edge server indicating whether the media content item is stored at the mobile edge server.

8. The method of claim 1, further comprising:
mapping the request for the media content item to a proxy server associated with the first access node of the wireless communication link serving the mobile platform.

9. The method of claim 1, further comprising:
when the media content item is not stored at the mobile edge server, sending the media content item to the mobile edge server for storage on the mobile edge server.

10. A method for use in a communication system comprising a content delivery network comprising an edge tier of servers located on mobile platforms served by wireless communication links of the communication system and two or more terrestrial tiers distributed geographically within the communication system, the method comprising:
receiving, at a mobile edge server located on a mobile platform, a request for a media content item for a device within the mobile platform, wherein the request was redirected from a server of the content delivery network outside of the mobile platform;
determining whether the media content item is stored at the mobile edge server;
when the media content item is stored at the mobile edge server, providing the media content item to the device; and
when the media content item is not stored at the mobile edge server:
querying, via a first access node serving the mobile platform via a wireless communication link, first terrestrial server of the two or more terrestrial tiers of servers for the media content item;
receiving the media content item from the first terrestrial server;
providing the media content item to the device;
determining that the mobile platform has transitioned to being served by a second access node while the mobile platform is in transit;
determining that the second access node is associated with a second terrestrial server based at least in part on a topology of the two or more terrestrial tiers of servers and a location of an exchange point between a ground network serving the second access node and the topology of the two or more terrestrial tiers of servers; and
updating an association of the mobile edge server for the content delivery network to be associated with the second terrestrial server based at least in part on the transition of the mobile platform to being served by the second access node and the determined association between the second access node and the second terrestrial server.

11. The method of claim 10, wherein querying the first terrestrial server comprises:
querying the first terrestrial server of a first tier of servers of the two or more terrestrial tiers of servers for the media content item, the first terrestrial server being coupled with the first access node serving the mobile platform and associated with the mobile edge server for the content delivery network;
receiving the media content item from the first terrestrial server when the media content item is stored at the first terrestrial server; and
receiving a message indicating that the media content item is not stored at the first terrestrial server when the media content item is not stored at the first terrestrial server.

12. The method of claim 11, wherein querying the first terrestrial server comprises:
querying, when the media content item is not stored at the first terrestrial server, a third terrestrial server of a second tier of servers of the two or more terrestrial tiers of servers for the media content item, wherein the third terrestrial server is associated with the first terrestrial server for the content delivery network;
receiving the media content item from the third terrestrial server when the media content item is stored at the third terrestrial server; and
receiving a message indicating that the media content item is not stored at the third terrestrial server when the media content item is not stored at the third terrestrial server.

13. The method of claim 12, wherein querying the first terrestrial server comprises:
querying, when the media content item is not stored at the third terrestrial server, an origin server of the content delivery network for the media content item; and
receiving the media content item from the origin server.

14. The method of claim 10, further comprising:
responsive to receiving the media content item from the first terrestrial server, storing the media content item at the mobile edge server.

15. A method for use in a communication system comprising a content delivery network comprising an edge tier of servers located on a plurality of mobile platforms served by wireless communication links of the communication system and two or more terrestrial tiers of servers distributed geographically within the communication system, the method comprising:
determining that a modem on a mobile platform of the plurality of mobile platforms is provided communications via a first satellite beam served by a first satellite access node;
determining, based at least in part on a topology of a network of the two or more terrestrial tiers of servers and a location of the first satellite access node, that a first terrestrial server of the two or more terrestrial tiers of servers is closest in network proximity to the first satellite access node;
associating a mobile edge server located on the mobile platform with the first terrestrial server of the two or more terrestrial tiers of servers based at least in part on the determining that the first terrestrial server is closest in network proximity to the first satellite access node;
determining that a second satellite access node is associated with a second terrestrial server of the two or more terrestrial tiers of servers based at least in part on a topology of the two or more terrestrial tiers of servers and a location of an exchange point between a ground network serving the second satellite access node and the topology of the two or more terrestrial tiers of servers; and
updating the association of the mobile edge server with the second terrestrial server of the two or more terrestrial tiers of servers based at least in part on determining that the second terrestrial server is closer in network proximity than the first terrestrial server and the determined association between the second satellite access node and the second terrestrial server.

16. The method of claim 15, further comprising:
obtaining an indication of a handover of the modem on the mobile platform from being provided the communications by the first satellite access node to being provided the communications by the second satellite access node; and
determining, based at least in part on the topology of the network of the two or more terrestrial tiers of servers and a location of the second satellite access node, that the second terrestrial server of the two or more terrestrial tiers of servers is closer in network proximity to the first satellite access node than the first terrestrial server.

17. The method of claim 16, wherein the mobile platform is located at a first location upon updating the association of the mobile edge server, and wherein the first location is geographically closer to the first terrestrial server than to the second terrestrial server.

18. The method of claim 15, further comprising:
determining a group of satellite beams associated with the first satellite access node; and
selecting the first satellite access node to communicate with the mobile edge server located on the mobile platform based at least in part on the first satellite beam being a member of the group of satellite beams.

19. The method of claim 15, further comprising:
associating each of the edge tier of servers with respective servers of the two or more terrestrial tiers of servers based at least in part on the topology of the network of the two or more terrestrial tiers of servers and locations of respective serving satellite access nodes of a plurality of satellite access nodes of the communication system.

20. The method of claim 15, further comprising:
receiving a request for a media content item from the mobile edge server located on the mobile platform prior to updating the association of the mobile edge server; and
forwarding the request for the media content item to the first terrestrial server of the two or more terrestrial tiers of servers.

21. The method of claim 20, further comprising:
receiving the media content item from the first terrestrial server of the two or more terrestrial tiers of servers; and
forwarding the media content item to the mobile edge server located on the mobile platform.

22. The method of claim 20, further comprising:
receiving, after updating the association of the mobile edge server, the media content item from the second terrestrial server of the two or more terrestrial tiers of servers or an origin server of the two or more terrestrial tiers of servers; and
forwarding the media content item to the mobile edge server located on the mobile platform.

23. The method of claim 20, further comprising:
receiving the media content item from an origin server of the two or more terrestrial tiers of servers; and
forwarding the media content item to the mobile edge server located on the mobile platform.

24. A communication system, comprising:
a content delivery network comprising an edge tier of servers located on mobile platforms served by wireless communication links of the communication system and two or more terrestrial tiers of servers distributed geographically within the communication system;
a processor;
memory in electronic communication with the processor; and
instructions stored in the memory and executable by the processor to cause the communication system to:
receive a request for a media content item from a device within a mobile platform served via a wireless communication link of the communication system;
determine an identity of a mobile edge server located on the mobile platform based at least in part on a network address of the device associated with the request;
determine whether the media content item is stored on the mobile edge server;
when the media content item is stored on the mobile edge server, redirect the request for the media content item to the mobile edge server;
when the media content item is not stored on the mobile edge server, determining whether the media content item is stored on a first terrestrial server of a first tier of servers of the two or more terrestrial tiers of servers, the first terrestrial server being coupled with a first access node serving the mobile platform and associated with the mobile edge server for the content delivery network;
when the media content item is stored on the first terrestrial server of the first tier of servers, redirecting the request for the media content item to the first terrestrial server;
determine that the mobile platform has transitioned to being served by a second access node while the mobile platform is in transit;
determine that the second access node is associated with a second terrestrial server based at least in part on a topology of the two or more terrestrial tiers of servers and a location of an exchange point between a ground network serving the second access node and the topology of the two or more terrestrial tiers of servers; and
update the association of the mobile edge server for the content delivery network to be associated with the second terrestrial server based at least in part on the transition of the mobile platform to being served by the second access node and the determined association between the second access node and the second terrestrial server.

25. The communication system of claim 24, wherein the instructions stored in the memory and executable by the processor further cause the communication system to:
when the media content item is not stored on the first terrestrial server, determine whether the media content item is stored on a third terrestrial server, wherein the third terrestrial server is of a second tier of servers of the two or more terrestrial tiers of servers, wherein the third terrestrial server is associated with the first terrestrial server; and
when the media content item is stored on the third terrestrial server, redirect the request for the media content item to the third terrestrial server.

26. The communication system of claim 25, wherein the instructions stored in the memory and executable by the processor further cause the communication system to:
when the media content item is not stored on the third terrestrial server, redirect the request for the media content item to an origin server of the content delivery network.

27. The communication system of claim 24, wherein the instructions stored in the memory and executable by the processor further cause the communication system to:
provide an address of the mobile edge server to the device in response to the request for the media content item; or
send an instruction to the mobile edge server to provide the media content item in response to the request for the media content item.

28. A communication system, comprising:
a content delivery network comprising an edge tier of servers located on mobile platforms served by wireless communication links of the communication system and two or more terrestrial tiers of servers distributed geographically within the communication system;
a processor;
memory in electronic communication with the processor; and
instructions stored in the memory and executable by the processor to cause the communication system to:
receive, at a mobile edge server located on a mobile platform, a request for a media content item for a device within the mobile platform, wherein the request was redirected from a server of the content delivery network outside of the mobile platform;
determine whether the media content item is stored at the mobile edge server;
when the media content item is stored at the mobile edge server, provide the media content item to the device; and
when the media content item is not stored at the mobile edge server:
query, via a first access node serving the mobile platform via a wireless communication link, first terrestrial server of the two or more terrestrial tiers of servers for the media content item;
receive the media content item from the first terrestrial server;
provide the media content item to the device;
determine that the mobile platform has transitioned to being served by a second access node while the mobile platform is in transit;
determining that the second access node is associated with a second terrestrial server based at least in part on a topology of the two or more terrestrial tiers of servers and a location of an exchange point between a ground network serving the second access node and the topology of the two or more terrestrial tiers of servers; and
update an association of the mobile edge server for the content delivery network to be associated with the second terrestrial server based at least in part on the transition of the mobile platform to being served by the second access node and the determined association between the second access node and the second terrestrial server.

29. The communication system of claim 28, wherein the instructions to query the first terrestrial server stored in the memory and executable by the processor further causes the communication system to:
query the first terrestrial server of a first tier of servers of the two or more terrestrial tiers of servers for the media content item, the first terrestrial server being coupled with the first access node serving the mobile platform and associated with the mobile edge server for the content delivery network;
receive the media content item from the first terrestrial server when the media content item is stored at the first terrestrial server; and
receive a message indicating that the media content item is not stored at the first terrestrial server when the media content item is not stored at the first terrestrial server.

30. The communication system of claim 29, wherein the instructions to query the first terrestrial server stored in the memory and executable by the processor further causes the communication system to:
query, when the media content item is not stored at the first terrestrial server, a third terrestrial server of a second tier of servers of the two or more terrestrial tiers of servers for the media content item, wherein the third terrestrial server is associated with the first terrestrial server for the content delivery network;
receive the media content item from the third terrestrial server when the media content item is stored at the third terrestrial server; and
receive a message indicating that the media content item is not stored at the third terrestrial server when the media content item is not stored at the third terrestrial server.

31. The communication system of claim 28, wherein the instructions stored in the memory and executable by the processor further cause the communication system to:
responsive to receiving the media content item from the first terrestrial server, store the media content item at the mobile edge server.

32. A communication system, comprising:
a content delivery network comprising an edge tier of servers located on a plurality of mobile platforms served by wireless communication links of the communication system and two or more terrestrial tiers of servers distributed geographically within the communication system;
a processor;
memory in electronic communication with the processor; and
instructions stored in the memory and executable by the processor to cause the communication system to:
determine that a modem on a mobile platform of the plurality of mobile platforms is provided communications via a first satellite beam served by a first satellite access node;
determine, based at least in part on a topology of a network of the two or more terrestrial tiers of servers and a location of the first satellite access node, that a first terrestrial server of the two or more terrestrial tiers of servers is closest in network proximity to the first satellite access node;
associate a mobile edge server located on the mobile platform with the first terrestrial server of the two or more terrestrial tiers of servers based at least in part on the determining that the first terrestrial server is closest in network proximity to the first satellite access node;
determining that a second satellite access node is associated with a second terrestrial server based at least in part on a topology of the two or more terrestrial tiers of servers and a location of an exchange point between a ground network serving the second satellite access node and the topology of the two or more terrestrial tiers of servers; and
update the association of the mobile edge server with the second terrestrial server of the two or more terrestrial tiers of servers based at least in part on determining that the second terrestrial server is closer in network proximity than the first terrestrial server and the determined association between the second access node and the second terrestrial server.

33. The communication system of claim 32, wherein the instructions stored in the memory and executable by the processor further cause the communication system to:
obtain an indication of a handover of the modem on the mobile platform from being provided the communications by the first satellite access node to being provided the communications by the second satellite access node; and
determine, based at least in part on the topology of the network of the two or more terrestrial tiers of servers and a location of the second satellite access node, that the second terrestrial server of the two or more terrestrial tiers of servers is closer in network proximity to the first satellite access node than the first terrestrial server.

34. The communication system of claim 32, wherein the instructions stored in the memory and executable by the processor further cause the communication system to:
determine a group of satellite beams associated with the first satellite access node; and
select the first satellite access node to communicate with the mobile edge server located on the mobile platform based at least in part on the first satellite beam being a member of the group of satellite beams.

35. The communication system of claim 32, wherein the instructions stored in the memory and executable by the processor further cause the communication system to:
associate each of the edge tier of servers with respective servers of the two or more terrestrial tiers of servers based at least in part on the topology of the network of the two or more terrestrial tiers of servers and locations of respective serving satellite access nodes of a plurality of satellite access nodes of the communication system.

36. The communication system of claim 32, wherein the instructions stored in the memory and executable by the processor further cause the communication system to:
receive a request for a media content item from the mobile edge server located on the mobile platform; and
forward the request for the media content item to the first terrestrial server of the two or more terrestrial tiers of servers.

37. The communication system of claim 36, wherein the instructions stored in the memory and executable by the processor further cause the communication system to:
receiving the media content item from the first terrestrial server of the two or more terrestrial tiers of servers; and
forwarding the media content item to the mobile edge server located on the mobile platform.

38. The method of claim 1, wherein updating the association of the mobile edge server for the content delivery network comprises:
updating a domain name server (DNS) with an address of the second terrestrial server to update the association of the mobile edge server for the content delivery network to be associated with the second terrestrial server.

* * * * *